US011533840B2

(12) United States Patent
Piotrowski et al.

(10) Patent No.: US 11,533,840 B2
(45) Date of Patent: Dec. 27, 2022

(54) SELF-PROPEL ACCESSORY

(71) Applicant: Canadian Tire Corporation, Limited, Toronto (CA)

(72) Inventors: Tomasz Piotrowski, Toronto (CA); Michael Fuina, King City (CA); Victor Lai, Markham (CA)

(73) Assignee: CANADIAN TIRE CORPORATION, LIMITED, Toronto (CA)

( * ) Notice: Subject to any disclaimer, the term of this patent is extended or adjusted under 35 U.S.C. 154(b) by 602 days.

(21) Appl. No.: 16/661,372

(22) Filed: Oct. 23, 2019

(65) Prior Publication Data

US 2020/0128729 A1 Apr. 30, 2020

Related U.S. Application Data

(60) Provisional application No. 62/749,998, filed on Oct. 24, 2018.

(51) Int. Cl.
*A01D 34/00* (2006.01)
*A01D 34/69* (2006.01)
*A01D 101/00* (2006.01)

(52) U.S. Cl.
CPC ........... *A01D 34/69* (2013.01); *A01D 34/006* (2013.01); *A01D 2101/00* (2013.01)

(58) Field of Classification Search
CPC .. A01D 34/69; A01D 34/006; A01D 2101/00; A01D 34/6806; A01D 34/00; A01D 42/00; A01D 75/00; A01D 75/006
See application file for complete search history.

(56) References Cited

U.S. PATENT DOCUMENTS

| | | | | |
|---|---|---|---|---|
| 4,295,326 A | * | 10/1981 | Green ................... | A01D 34/43 56/11.8 |
| 4,507,566 A | * | 3/1985 | Leatherman ....... | A01D 34/6806 290/38 B |
| 5,444,965 A | * | 8/1995 | Colens .................. | A01D 69/02 56/10.2 J |
| 5,809,765 A | * | 9/1998 | Hastings .............. | A01D 34/005 56/DIG. 17 |
| 6,105,348 A | * | 8/2000 | Turk ...................... | A01D 34/68 56/11.2 |

(Continued)

*Primary Examiner* — Yonel Beaulieu
(74) *Attorney, Agent, or Firm* — Alston & Bird LLP

(57) ABSTRACT

Described herein are self-propel accessories for walk behind/push-driven machines/devices comprising: drive assembly motor(s) operatively connected to at least one power supply; at least one drive assembly for imparting drive from the drive assembly motor(s) to at least one accessory wheel assembly that is operatively connected to an output shaft of the drive assembly motor(s) and one of an axle or a drive engagement surface of the at least one accessory wheel assembly having accessory ground engagement wheel(s) coupled to at least one end of the axle for rotation therewith; a controller for the drive assembly motor(s) having an actuator for engaging the drive assembly motor(s); and an attachment assembly for coupling the drive assembly motor(s), the at least one drive assembly and the at least one accessory wheel assembly to a housing of the push-driven machine or device in place of a wheel assembly/sub-assembly of the push-driven machine or device.

20 Claims, 22 Drawing Sheets

(56) References Cited

U.S. PATENT DOCUMENTS

| | | | | |
|---|---|---|---|---|
| 6,155,033 | A * | 12/2000 | Wians | A01D 34/6806 |
| | | | | 56/11.1 |
| 10,980,172 | B1 * | 4/2021 | Moss | A01D 34/74 |
| 2002/0083693 | A1 * | 7/2002 | Smith | A01D 43/16 |
| | | | | 56/12.7 |
| 2003/0144774 | A1 * | 7/2003 | Trissel | A01D 34/008 |
| | | | | 701/23 |
| 2003/0230067 | A1 * | 12/2003 | Weinlader | A01D 43/00 |
| | | | | 56/320.1 |
| 2004/0244754 | A1 * | 12/2004 | Smith | F02N 11/12 |
| | | | | 123/179.26 |
| 2010/0005769 | A1 * | 1/2010 | Landry | A01D 69/00 |
| | | | | 56/13.6 |
| 2012/0023882 | A1 * | 2/2012 | Hamburg | A01D 34/001 |
| | | | | 56/14.7 |
| 2013/0164600 | A1 * | 6/2013 | Rosskamp | H01M 50/213 |
| | | | | 429/159 |
| 2016/0044867 | A1 * | 2/2016 | Martin | F04D 29/4213 |
| | | | | 415/206 |
| 2018/0077862 | A1 * | 3/2018 | Smith | A01D 34/6806 |
| 2020/0080501 | A1 * | 3/2020 | Andre | F02D 41/042 |
| 2020/0122623 | A1 * | 4/2020 | Kuriyagawa | A01D 75/28 |
| 2020/0128729 | A1 * | 4/2020 | Piotrowski | A01D 34/6806 |
| 2021/0112712 | A1 * | 4/2021 | Vaughn | A01D 34/68 |
| 2021/0238815 | A1 * | 8/2021 | Kempken | E01C 23/0933 |
| 2022/0071085 | A1 * | 3/2022 | Graham | A01D 34/001 |

* cited by examiner

SELF-PROPEL ACCESSORY

CROSS-REFERENCE TO RELATED APPLICATIONS

The present application claims priority to and the benefit of U.S. Provisional Patent Application No. 62/749,998, as filed on Oct. 24, 2018; the contents of which as are hereby incorporated herein by reference in their entirety.

FIELD

The specification relates generally to walk behind or push-driven machines or devices, and specifically to self-propel accessories for walk behind or push-driven machines or devices.

BACKGROUND

Typical walk behind or push-driven machines or devices, such as many lawn mowers, can take a lot of user effort to propel. Depending on the physical strength and endurance of the user, the user may be discouraged from using these machines or devices and avoid them altogether.

SUMMARY

According to some embodiments, there is provided a self-propel accessory for a push-driven machine or device comprising: at least one drive assembly motor, the at least one drive assembly motor operatively connected to at least one power supply; at least one drive assembly for imparting drive from the at least one drive assembly motor to at least one accessory wheel assembly, the at least one drive assembly being operatively connected to an output shaft of the at least one drive assembly motor and one of an axle or a drive engagement surface of the at least one accessory wheel assembly, the at least one accessory wheel assembly having at least one accessory ground engagement wheel coupled to at least one end of the axle for rotation therewith; a controller for the at least one drive assembly motor, the controller having an actuator for engaging the at least one drive assembly motor; and an attachment assembly for coupling the at least one drive assembly motor, the at least one drive assembly and the at least one accessory wheel assembly to a housing of the push-driven machine or device in place of a wheel assembly or a wheel sub-assembly of the push-driven machine or device.

According to some embodiments, the self-propel accessory further comprises the at least one power supply.

According to some embodiments, the controller is configured to provide variable speed control for the drive assembly motor.

According to some embodiments the actuator comprises an ON/OFF switch or a multi-position switch.

According to some embodiments, the drive assembly motor is a direct current (DC) motor.

According to some embodiments, the voltage supplied to the DC motor by the power supply is in the range of about 20 Volts (V) to about 40 Volts (V).

According to some embodiments, the power supply is a battery, optionally a rechargeable battery.

According to some embodiments, a track width of the self-propel accessory is adjustable. According to some embodiments, the axle is adjustable in length.

According to some embodiments, the push-driven machine or device is a lawn mower.

According to some embodiments, the at least one accessory wheel assembly comprises a first accessory ground engagement wheel coupled to an end of the axle and a second accessory ground engagement wheel coupled to an opposing end of the axle.

According to some embodiments, the attachment assembly is configured to couple the at least one drive assembly motor, the at least one drive assembly motor, the at least one drive assembly and the at least one accessory wheel assembly to the housing of the push-driven machine or device in place of the wheel sub-assembly of the push-driven machine or device.

According to some embodiments, the self-propel accessory further comprises a clutch assembly for engaging and disengaging the at least one drive assembly from the at least one accessory wheel assembly, based on the direction of drive to be imparted by the at least one drive assembly to the at least one accessory wheel assembly. According to some embodiments, the clutch assembly comprises: a wheel engagement member operatively connected to the at least one accessory ground engagement wheel, via the drive engagement surface, and a shaft for rotation therewith, the wheel engagement member configured to drive rotation of the at least one accessory ground engagement wheel about an axis defined by the axle; a drive rotation transfer member operatively connected to the at least one drive assembly, the drive rotation transfer member configured to rotate about another axis defined by the shaft in the imparted direction of drive; and wherein when the imparted direction of drive is a second drive direction opposite the first drive direction, the drive rotation transfer member is rotated out of driving engagement with the wheel engagement member.

According to some embodiments, the self-propel accessory further comprises a position control mechanism.

According to some embodiments, there is provided a kit for converting a push-driven machine or device into a self-propelled machine or device comprising at least one self-propel accessory as described herein.

According to some embodiments, there is provided a system for converting a push-driven machine or device into a self-propelled machine or device comprising a pair of self-propel accessories as described herein, wherein one of the pair of self-propel accessories being complimentary to the other one of the pair of self-propel accessories.

BRIEF DESCRIPTIONS OF THE DRAWINGS

For a better understanding of the various implementations described herein and to show more clearly how they may be carried into effect, reference will now be made, by way of example only, to the accompanying drawings in which.

DETAILED DESCRIPTION

Figure 1:
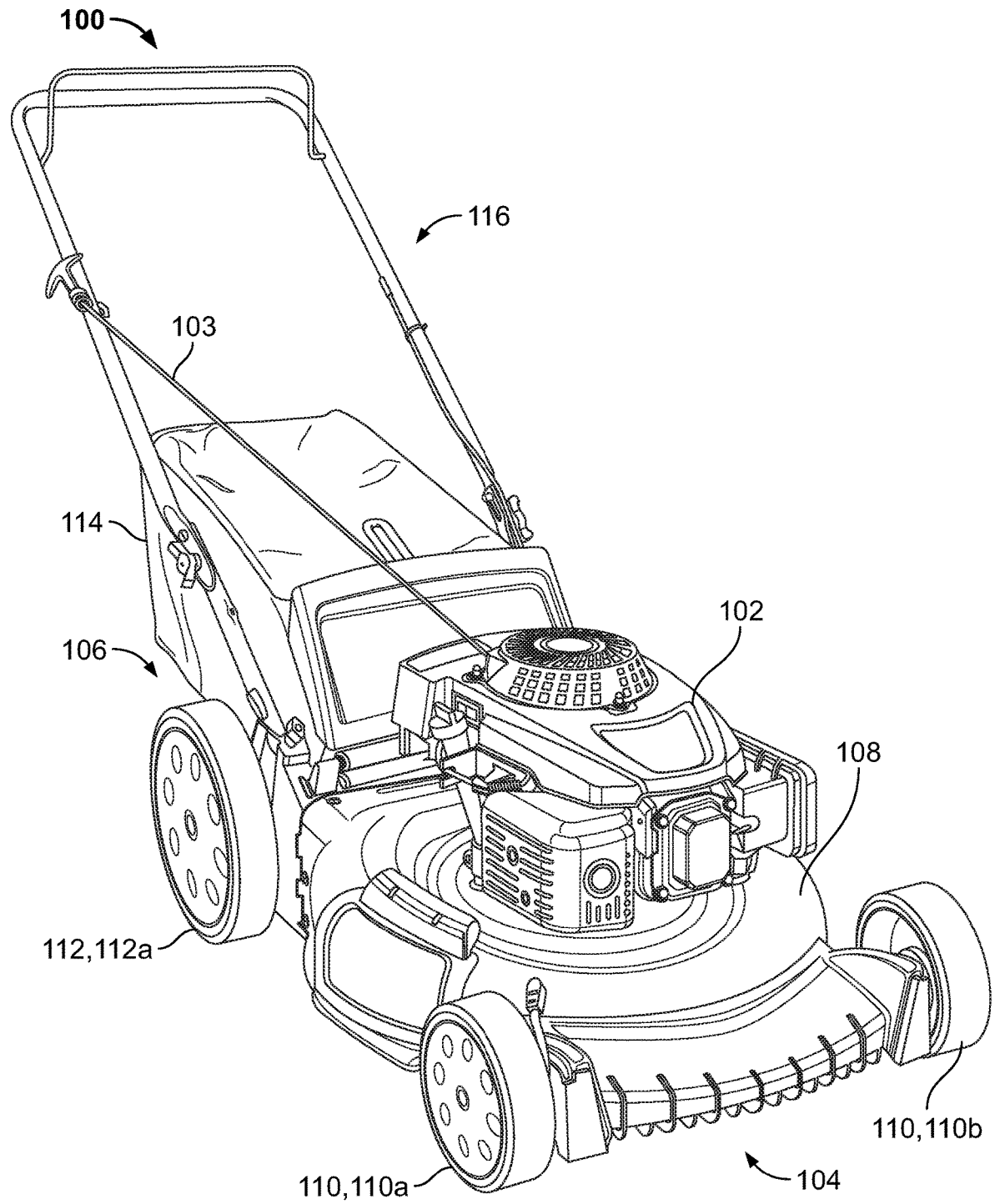
FIG. 1 depicts a perspective view of an example walk behind push-driven lawn mower, as known in the art.

Herein described are self-propel accessories for walk behind or push-driven machines or devices, such as lawn mowers, tool carts and dollies. The described self-propel accessories are configured to replace at least one wheel assembly or sub-assembly of the walk behind/push-driven machines or devices to convert those machines or devices into a self-propelled machine or device when actuated. When self-propelled, the walk behind/push-driven machines or devices usually require less effort to push. According to some embodiments, the self-propel accessory is configured such that it can be retrofitted onto a variety of walk behind/push-driven machines or devices. For example, the self-propel accessories may not be permanently integrated with the walk behind/push-driven machines or devices in that they may be removably coupled to those machines or devices. As a result, according to some embodiments, a user may attach and remove the self-propel accessory as desired. Additionally, since the self-propel accessory typically does not interfere with usual operation of the walk behind or push-driven machines or devices, according to some embodiments, the self-propel accessories may be selectively disengaged and the walk behind or push-driven machines or devices may be operated as usual even when the self-propel accessory is installed. In other words, there is usually no need to remove the self-propel accessory to operate the walk behind or push-driven machines or devices as normal. According to some embodiments, a plurality of the components of the self-propel accessories are provided as a self-contained unit.

It will be appreciated that for simplicity and clarity of illustration, where considered appropriate, reference numerals may be repeated among the figures to indicate corresponding or analogous elements. In addition, numerous specific details are set forth in order to provide a thorough understanding of the exemplary aspects of the present application described herein. However, it will be understood by those of ordinary skill in the art that the exemplary aspects described herein may be practiced without these specific details. In other instances, well-known methods, procedures and components have not been described in detail so as not to obscure the exemplary aspects described herein. Also, the description is not to be considered as limiting the scope of the exemplary aspects described herein. Any systems, method steps, method blocks, components, parts of components, and the like described herein in the singular are to be interpreted as also including a description of such systems, method steps or tasks, components, parts of components, and the like in the plural, and vice versa.

Attention is directed to FIG. 1 which depicts an example of a typical walk behind push-driven lawn mower 100. Lawn mower 100 includes a gas engine (not shown) covered by engine housing 102 that is operatively connected to cutting blades (not shown). However, according to some embodiments, lawn mower 100 is electrically powered. The gas engine is engaged by pulling a starter cord 103. Front and rear wheel assemblies 104 and 106, respectively, are coupled to mower deck housing 108. Front and rear wheel assemblies 104, 106 comprise ground engagement wheels 110a,b (collectively, front wheels 110) and 112a,b (collectively, rear wheels 112). Lawn mower 100 also comprises a grass catcher bag 114 operatively connected to a grass discharge chute (not shown). Handle bar assembly 116 is coupled to mower deck housing 108 rearwards of front wheel assembly 104.

Attention is directed to FIGS. 2A to 2E, which depict lawn mower 100 modified by an example self-propel accessory 200, according to non-limiting embodiments. Self-propel accessory 200 comprises at least one power supply 202 and a drive assembly motor 204, operatively connected to the power supply 202, a drive assembly 206, an accessory wheel assembly 208, a controller 210 for the drive assembly motor 204 and attachment assembly 212 for coupling the drive assembly motor 204, drive assembly 206 and accessory wheel assembly 208 to mower deck housing 108 in place of a wheel assembly of lawn mower 100, such as front wheel assembly 104 or rear wheel assembly 106. According to some embodiments, self-propel accessory 200 does not comprise at least one power supply, but such power supply is provided separately. According to some embodiments, attachment assembly 212 also couples the power supply 202 to the mower deck housing 108 (directly or indirectly).

According to some embodiments, power supply 202 comprises at least one battery, which may be rechargeable. As noted above, power supply 202 is operatively connected to drive assembly motor 204, which is separate from the engine of lawn mower 100. According to some embodiments, drive assembly motor 204 is a direct current (DC) motor. According to some embodiments, power supply 202 supplies voltage to the drive assembly motor 204 in the range of about 20 Volts (V) to about 40V. According to some embodiments, the drive assembly motor 204 may be a DC motor in the range of about 20V to about 40V. It is understood that any suitable power supply and drive assembly motor is contemplated.

Drive assembly 206 is configured to impart (transfer) drive (torque) from drive assembly motor 204 to accessory wheel assembly 208 when drive assembly motor 204 is engaged. Drive assembly 206 is operatively connected to an output shaft (not shown) of drive assembly motor 204 and to an axle of accessory wheel assembly 208.

Figure 3:
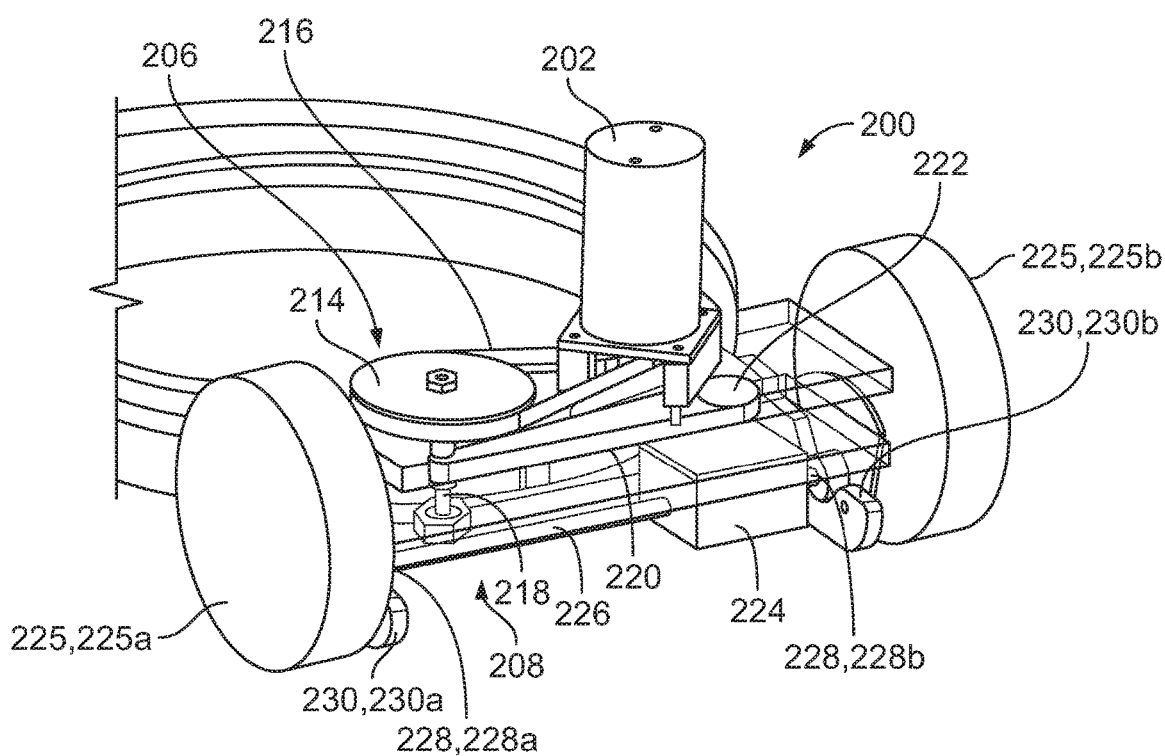
FIG. 3 depicts a schematic of the self-propelled accessory of FIGS. 2A to 2E.

Attention is directed FIG. 3, which depicts a schematic of an example configuration of drive assembly 206. For clarity, some features of self-propel accessory have been omitted, such as power supply 202. Drive assembly 206 comprises pulley 214 coupled to the output shaft of drive assembly motor 202 via a first endless drive member, such as belt 216. It is understood that any type of endless drive member suitable for transferring torque from the output shaft to pulley 214 is contemplated. For example, according to some embodiments, pulley 216 is replaced with a sprocket and the endless drive member comprises a chain configured to engage with teeth of the sprocket. Pulley 214 is coupled to pulley shaft 218 which comprises at least one endless drive member engagement surface (which may be part of another pulley coupled to the pulley shaft 218 for rotation therewith). A second endless drive member, such as belt 220, is engaged with the at least one endless drive member engagement surface of the pulley shaft 218 to transfer torque from the pulley shaft 218 to a pulley 222 operatively connected to a plurality of gears (not shown) covered by gear box 224. The plurality of gears are operatively connected to axle 226 of accessory wheel assembly 208 to drive rotation of axle 226, and accessory ground engagement wheels 225a,b (collectively, wheels 225) therewith.

As shown in FIG. 3, at least one accessory ground engagement wheel is coupled to an opposing end. In the example shown, at least one accessory ground engagement wheel is coupled to each opposing end of axle 226 (first end 228a and second end 228b, collectively ends 228). Brackets 230a,b (collectively brackets 230) support wheels 225 and comprise part of attachment assembly 212.

According to some embodiments, attachment assembly 212 comprises brackets 230 coupled to the accessory wheel assembly 208 and brackets 232a,b (collectively brackets 232) (see example embodiment depicted in FIG. 6C) and fasteners 234. Fasteners 234 comprise any suitable combination of fasteners, such as bolts, pins, screws, nuts, and the like, for coupling brackets 230 and 232 together, and brackets 232 to mower deck housing 108 is contemplated. According to some embodiments, the attachment assembly 212 is configured to removably couple self-propel accessory 200 to lawn mower deck housing 108. It is understood that any suitable brackets and fasteners, in any suitable configuration, is contemplated.

According to some embodiments, self-propel accessory 200 is configured to be attached to a variety of walk behind or push-driven machines or devices. For example, according to some embodiments, the track width (distance between wheels 230) of the accessory wheel assembly 208 is adjustable. According to some embodiments, the length of axle 226 is adjustable. For example, according to some embodiments, axle 226 comprises an axial telescopic member. According to some embodiments, the track width is adjustable from an initial track width of about 21 inches to a final track width to about 22 inches.

As noted above, self-propel accessory 200 comprises a controller 210 for drive assembly motor 204. Controller 210 is operatively connected drive assembly motor 204 by a suitable electrical circuit between controller 210, drive assembly motor 204 and power supply 202 (comprising, for example, wires 236). According to some embodiments, controller 210 is configured to drive the drive assembly motor 204 in two directions (forward and reverse) such that the lawn mower may travel in forward or reverse when the self-propel accessory is in operation.

Controller 210 has an actuator 238 for engaging drive assembly motor 204. Actuator 238 comprises any actuating device suitable for providing electrical engagement of drive assembly 204 with power supply 202. For example, according to some embodiments, actuator 238 is a switch, such as an ON/OFF switch. According to some embodiments, controller 210 is configured to provide variable speed control of drive assembly motor 204 such that the speed at which the walk behind or push-driven machines or devices traverses a path, or portion thereof, can be adjusted. For example, according to some embodiments, actuator 238 comprises a multi-position switch in which each position is associated with a different speed and/or drive direction of the drive assembly motor 204.

Figure 2A:
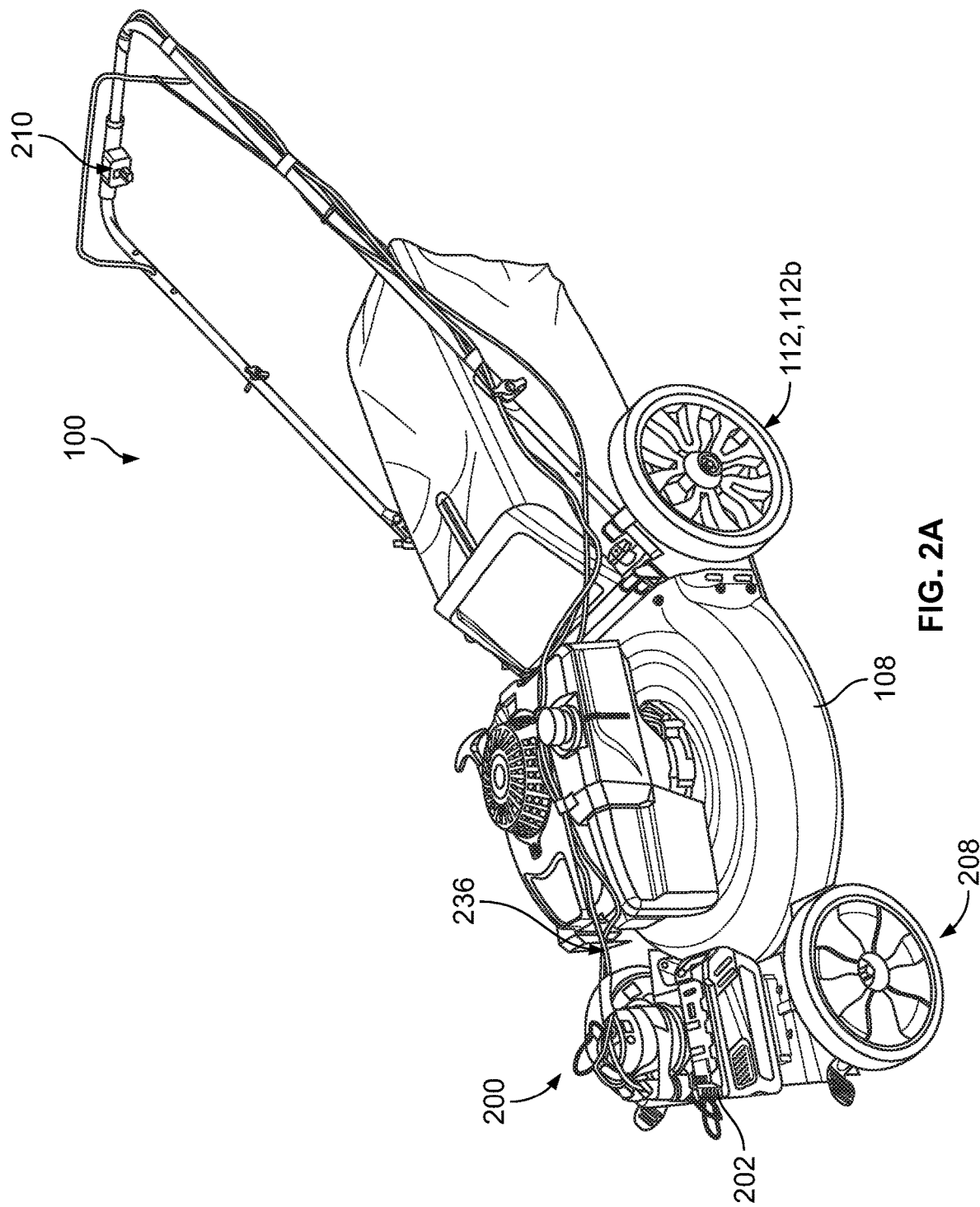
FIGS. 2A to 2E depicts various views of an example self-propel accessory, according to non-limiting embodiments, installed on the example walk behind push-driven lawn mower of FIG. 1.
Figure 2B:
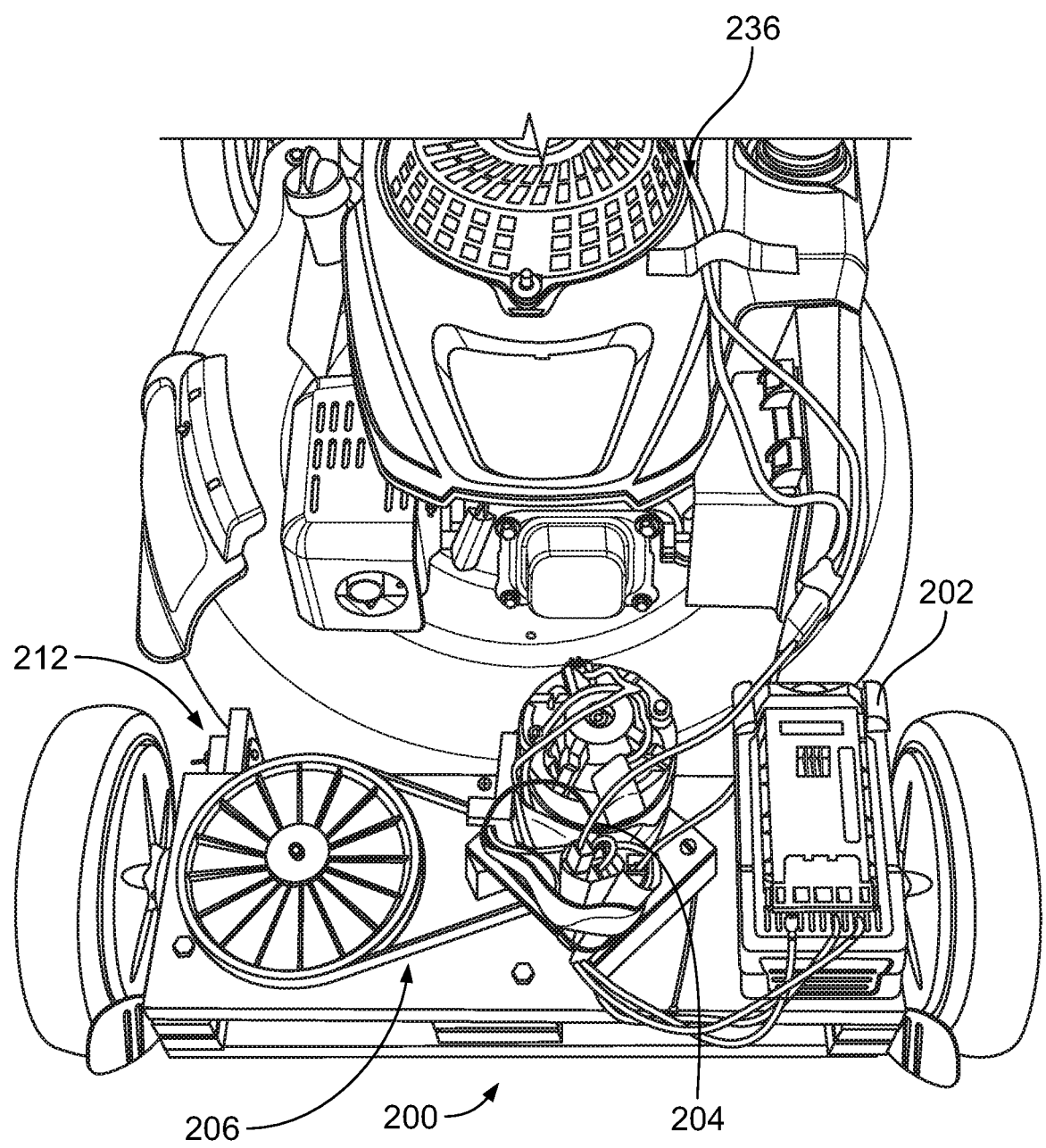
Figure 2C:
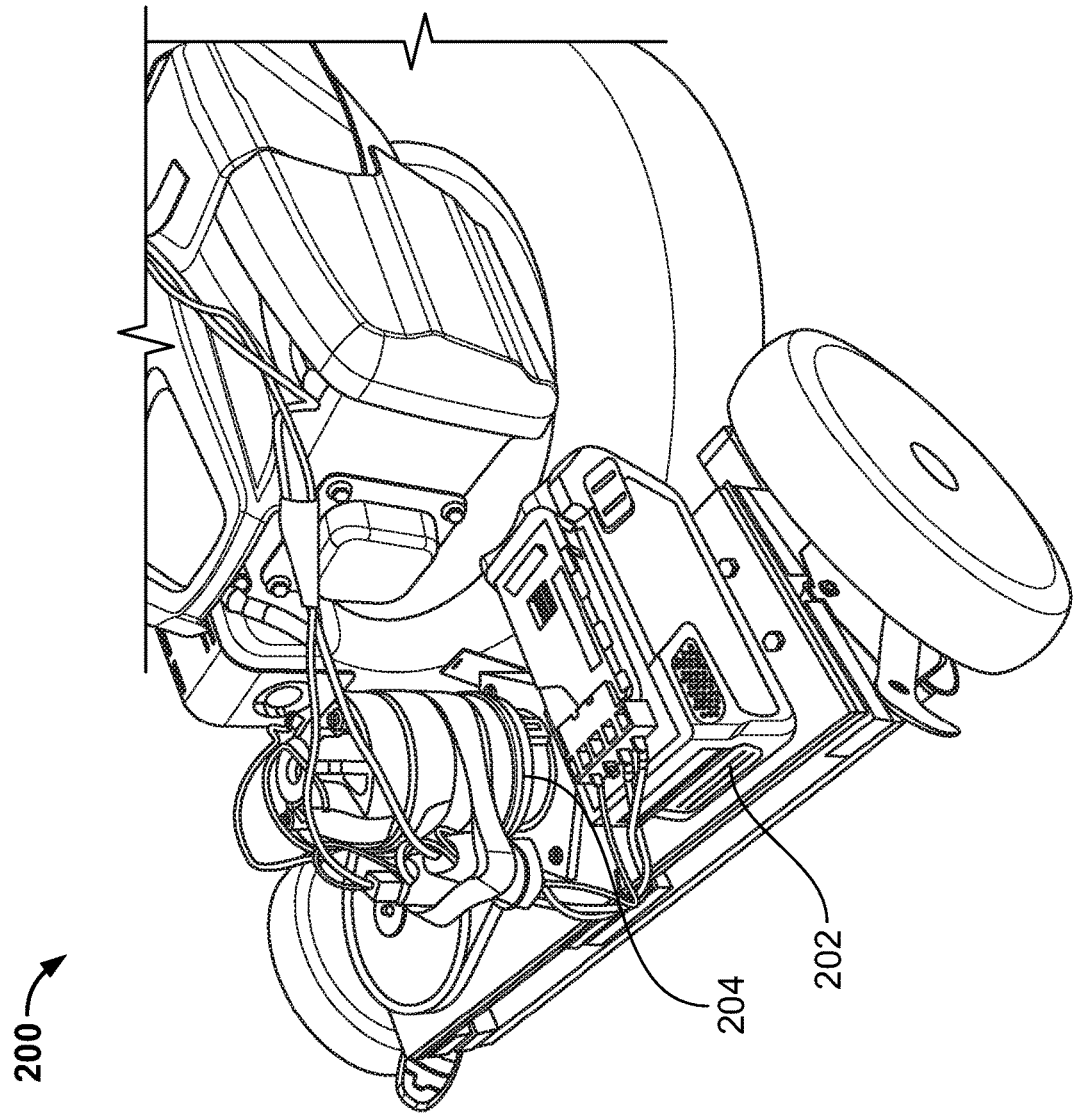
Figure 2D:
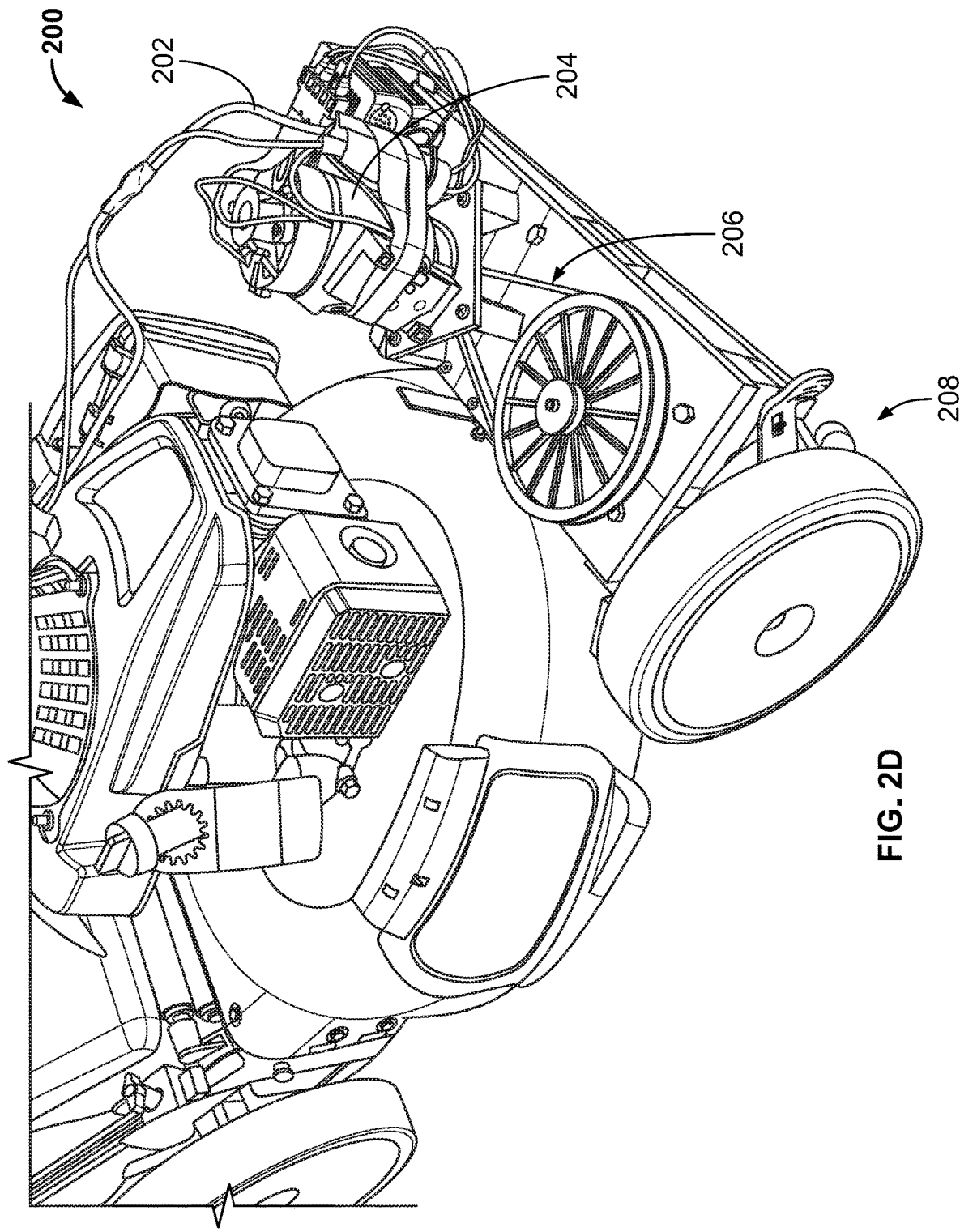
Figure 2E:
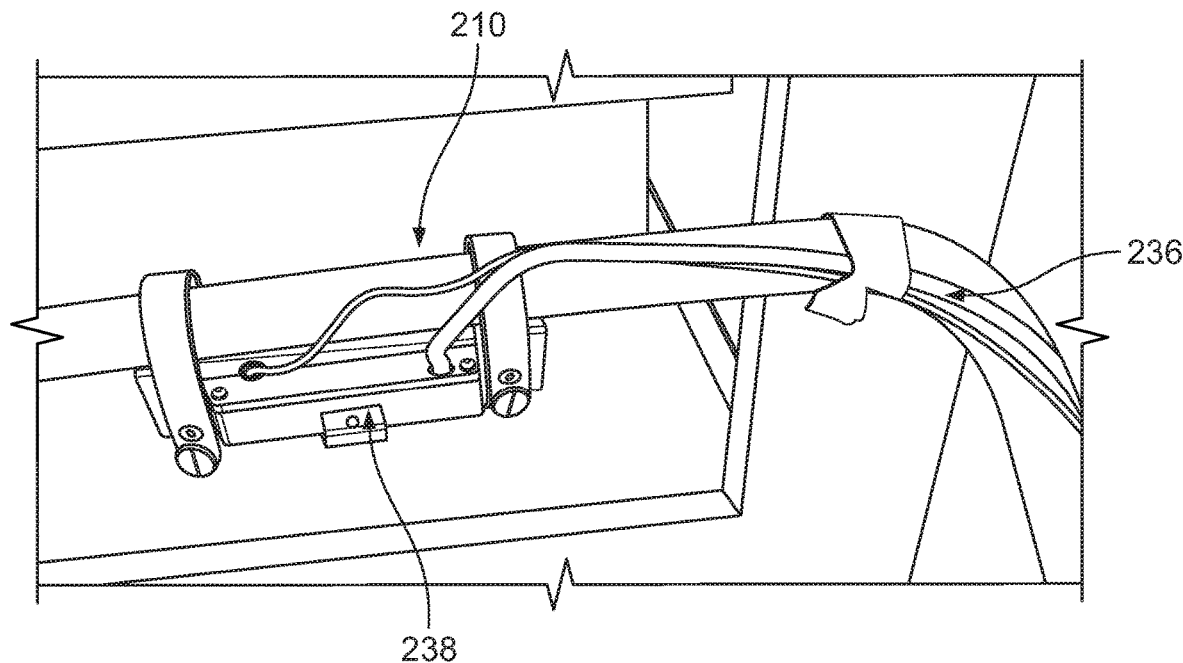

According to some embodiments, controller 210 comprises more than one actuator. For example, according to some embodiments, a first actuator may be configured to turn the drive assembly motor on and off, where ON places the self-propel accessory in a stand-by mode (i.e., drive assembly motor is electrically engaged, but drive assembly is not being driven). A second actuator may be included to engage and disengage the drive assembly via, for example, a clutch mechanism such that it is being driven by the drive assembly motor. According to some embodiments, controller 210 is wirelessly connected to the drive assembly motor. According to some embodiments, controller 210 and the drive assembly motor are connected via any suitable combination of wired and wireless connections and/or devices. As shown in FIG. 2E, according to some embodiments, controller 210 is mounted on handle bar assembly 116; however, any suitable placement of controller 210 is contemplated.

Figure 6A:
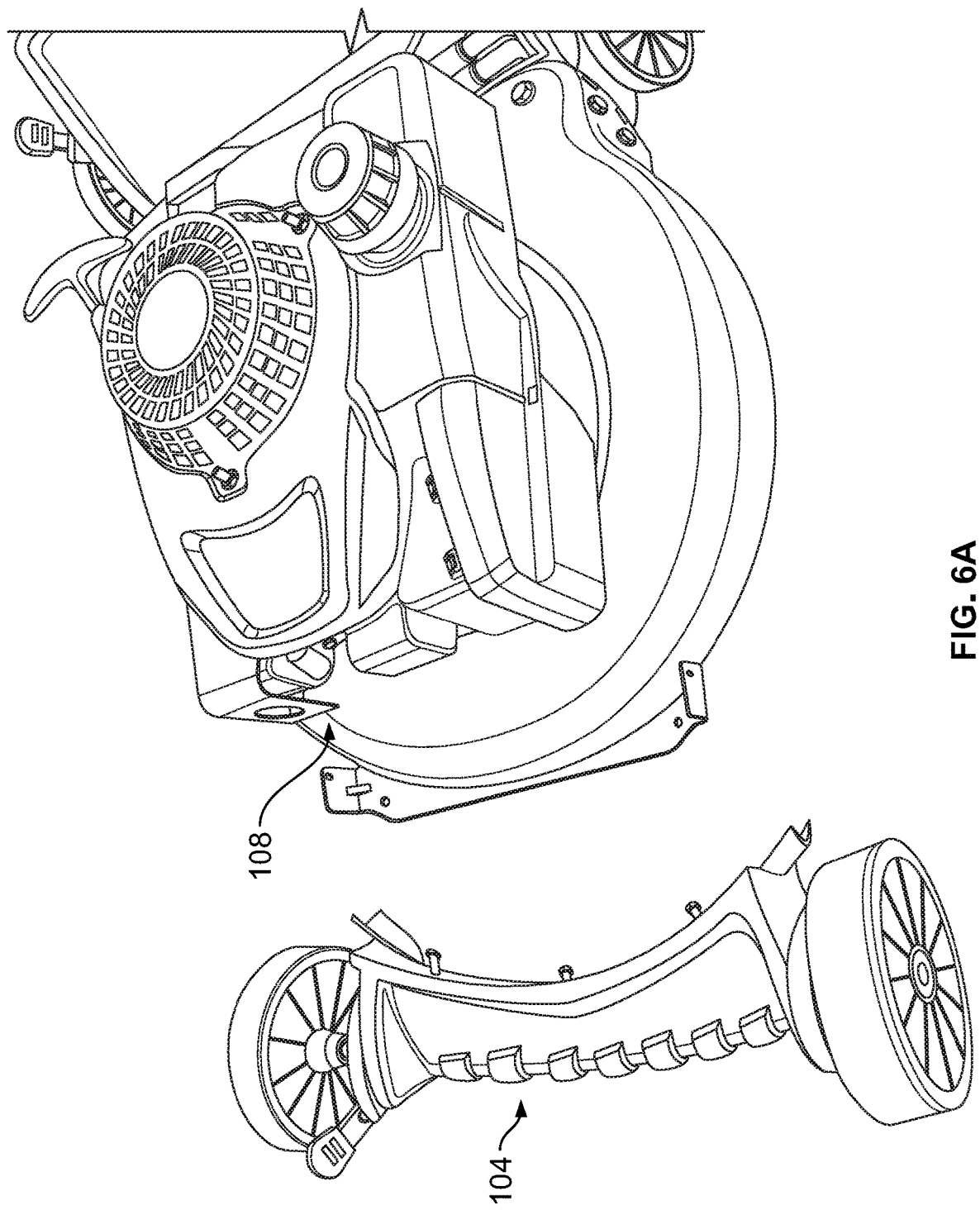
FIGS. 6A to 6F depict a method of installing a self-propel accessory, according to non-limiting embodiments.
Figure 6B:
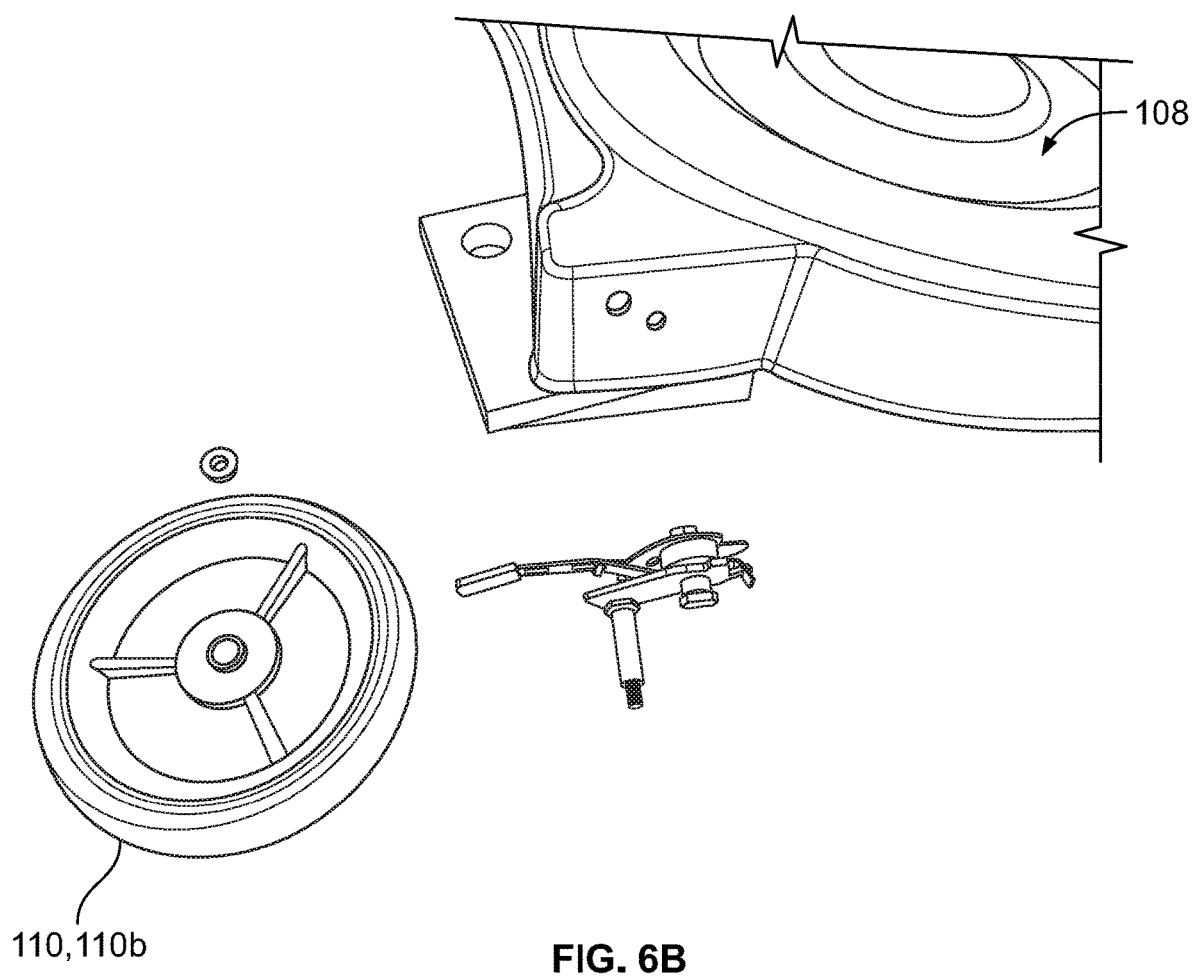
Figure 6C:
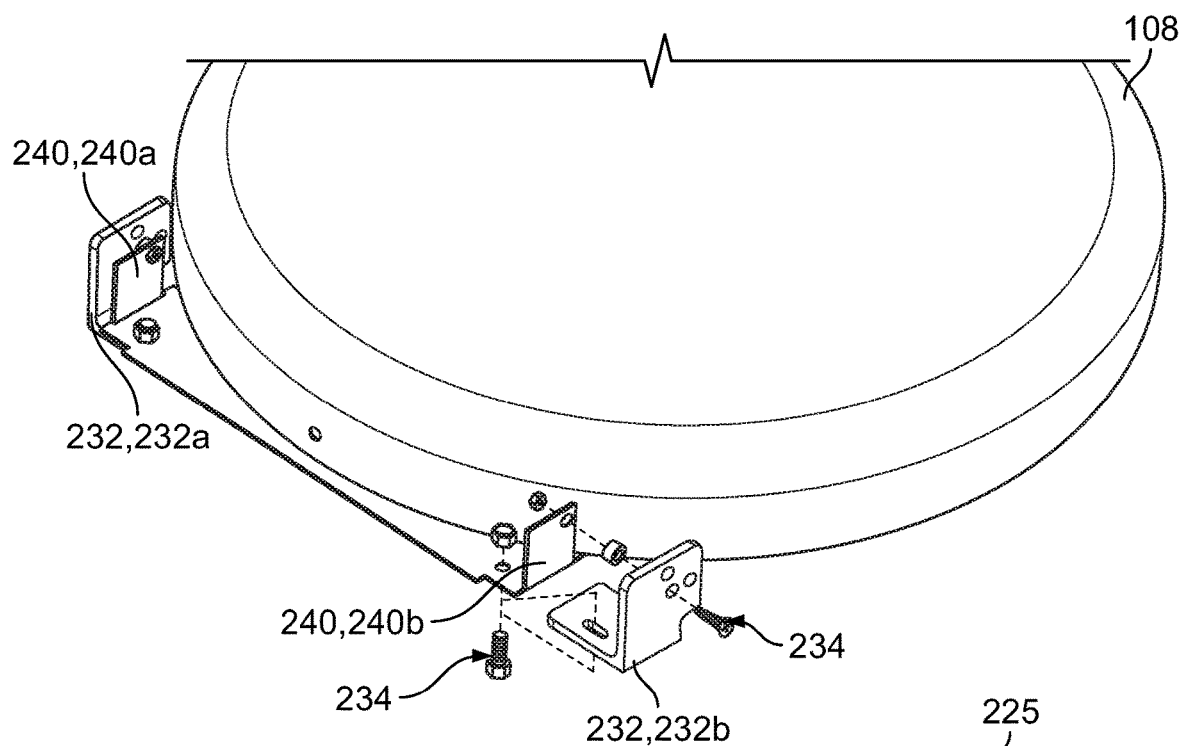
Figure 6D:
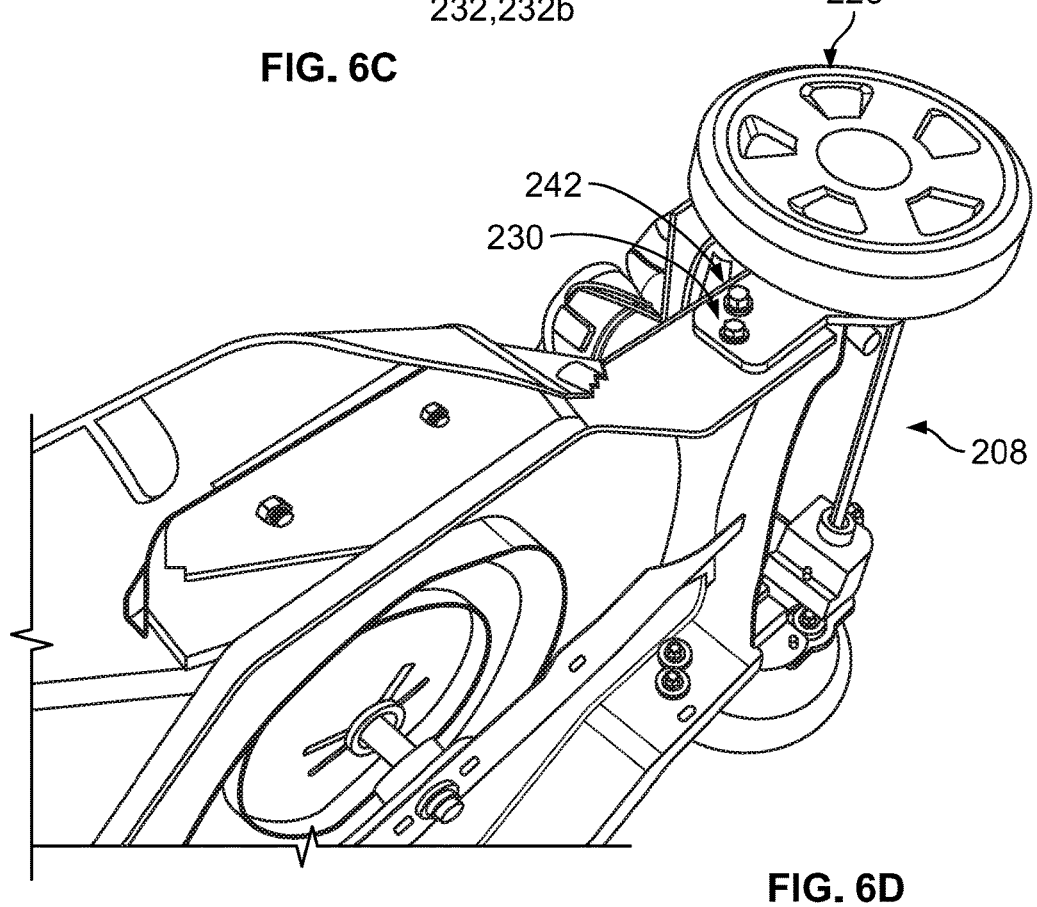
Figure 6E:
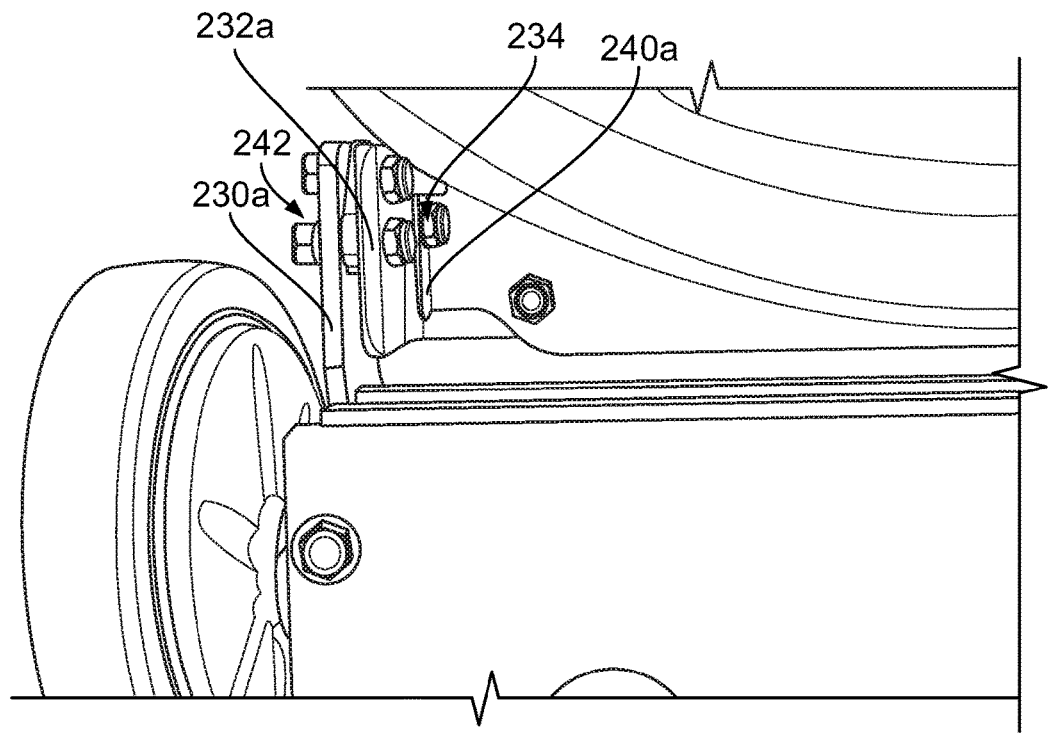
Figure 6F:
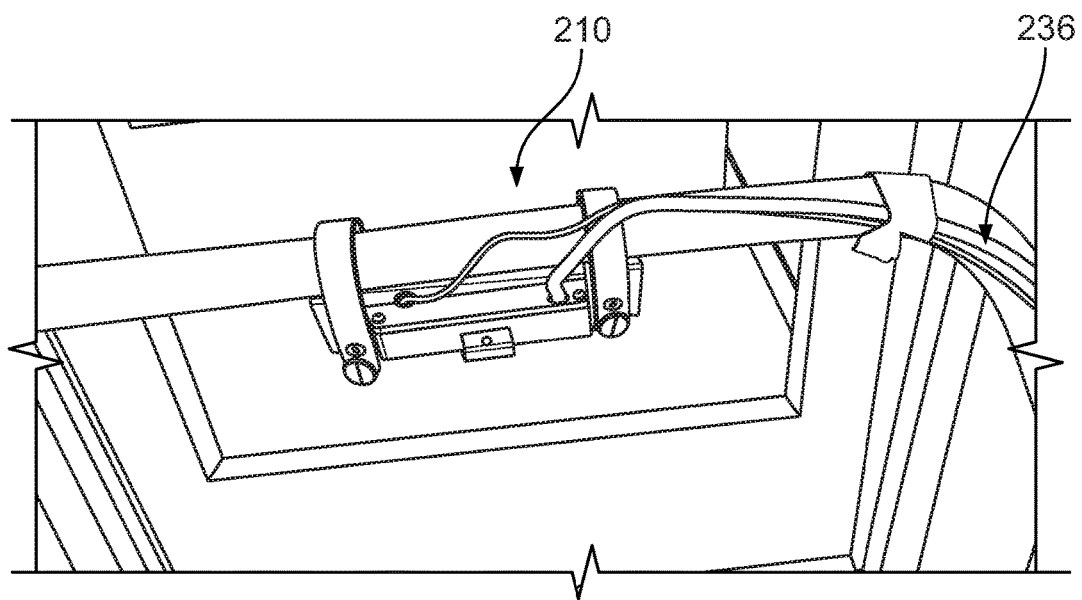
Figure 7:
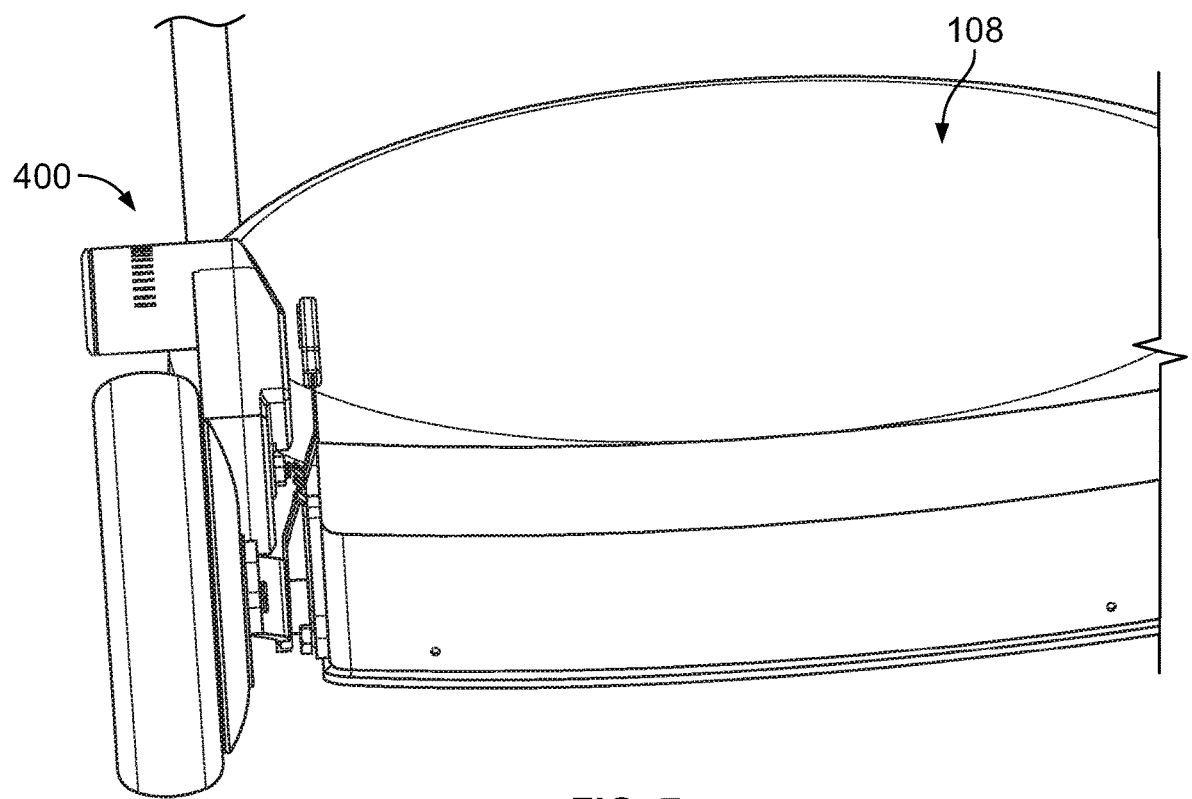
FIG. 7 depicts a front elevation view of a self-propel accessory, according to non-limiting embodiments.
Figure 8:
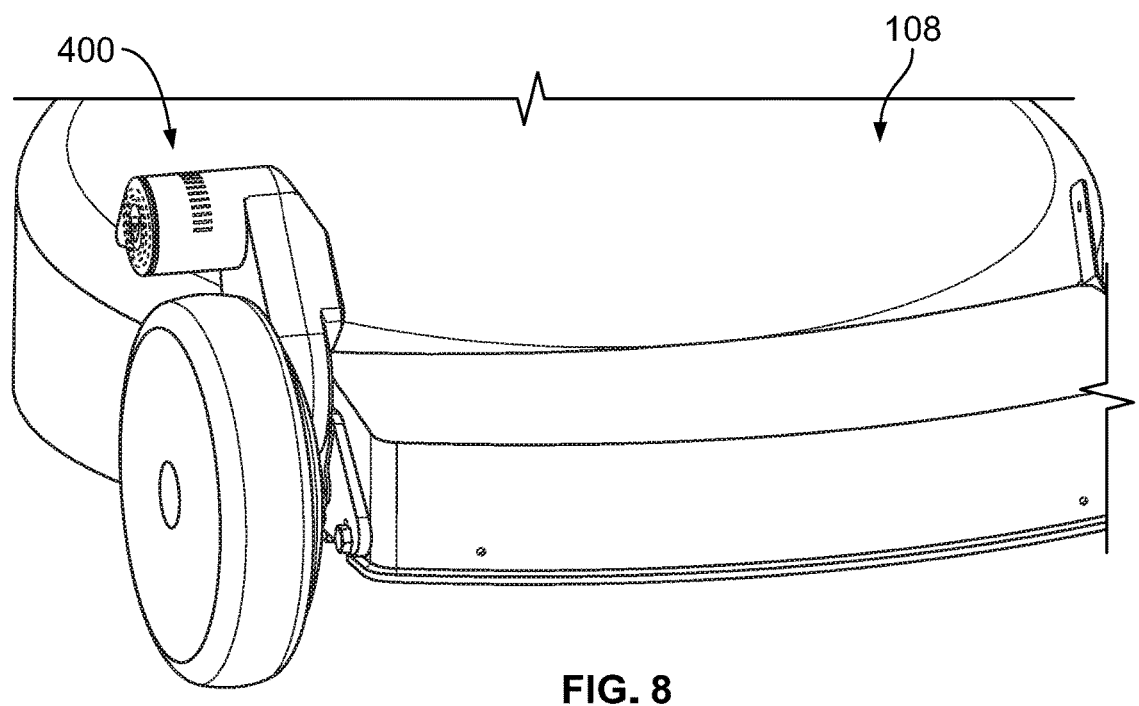
FIG. 8 depicts a front perspective view of the self-propel accessory of FIG. 7.

Attention is directed to FIGS. 6A to 6F which depict an example method of installing a self-propel accessory on a walk behind or push-driven machine or device, according to non-limiting embodiments. Front wheel assembly 104 of lawn mower 100 is detached from housing 108 by, for example, unscrewing and releasing various fasteners attaching front wheel assembly 104 to housing 108 (FIGS. 6A, 6B). Brackets 232 are each coupled to lips 240a,b (collectively, lips 240) of housing 108 (FIG. 6C). Brackets 230, coupled to accessory wheel assembly 208, are coupled to brackets 232 via, for example, fasteners 242 (FIGS. 6D, 6E). Controller 210 is operatively connected to drive assembly motor 204 and power source 202 via, for example, wires 236 and mounted to handle bar assembly 116.

Figure 4:
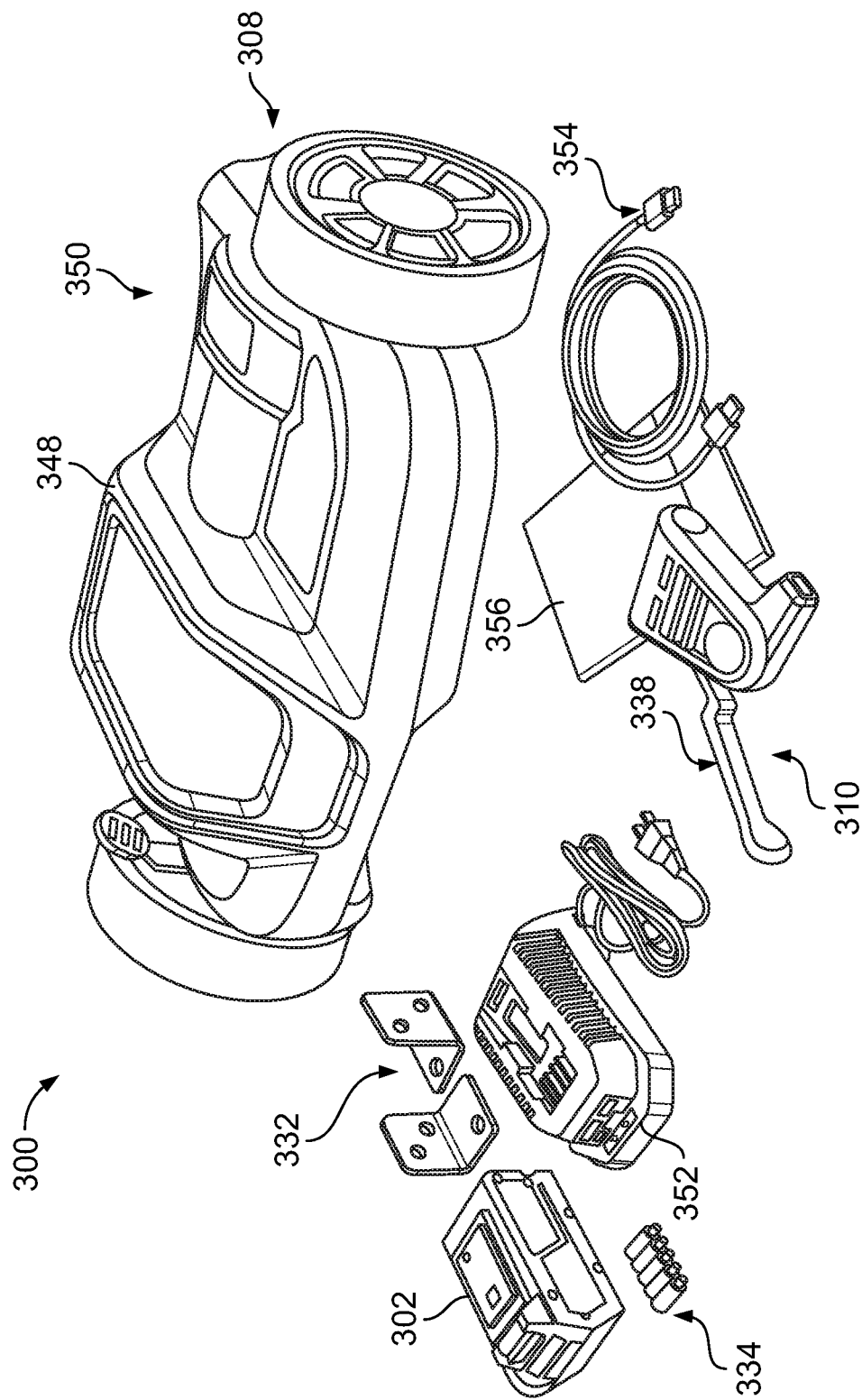
FIG. 4 depicts a kit for converting a walk behind push-driven lawn mower into a self-propelled lawn mower, according to non-limiting embodiments.
Figure 5:
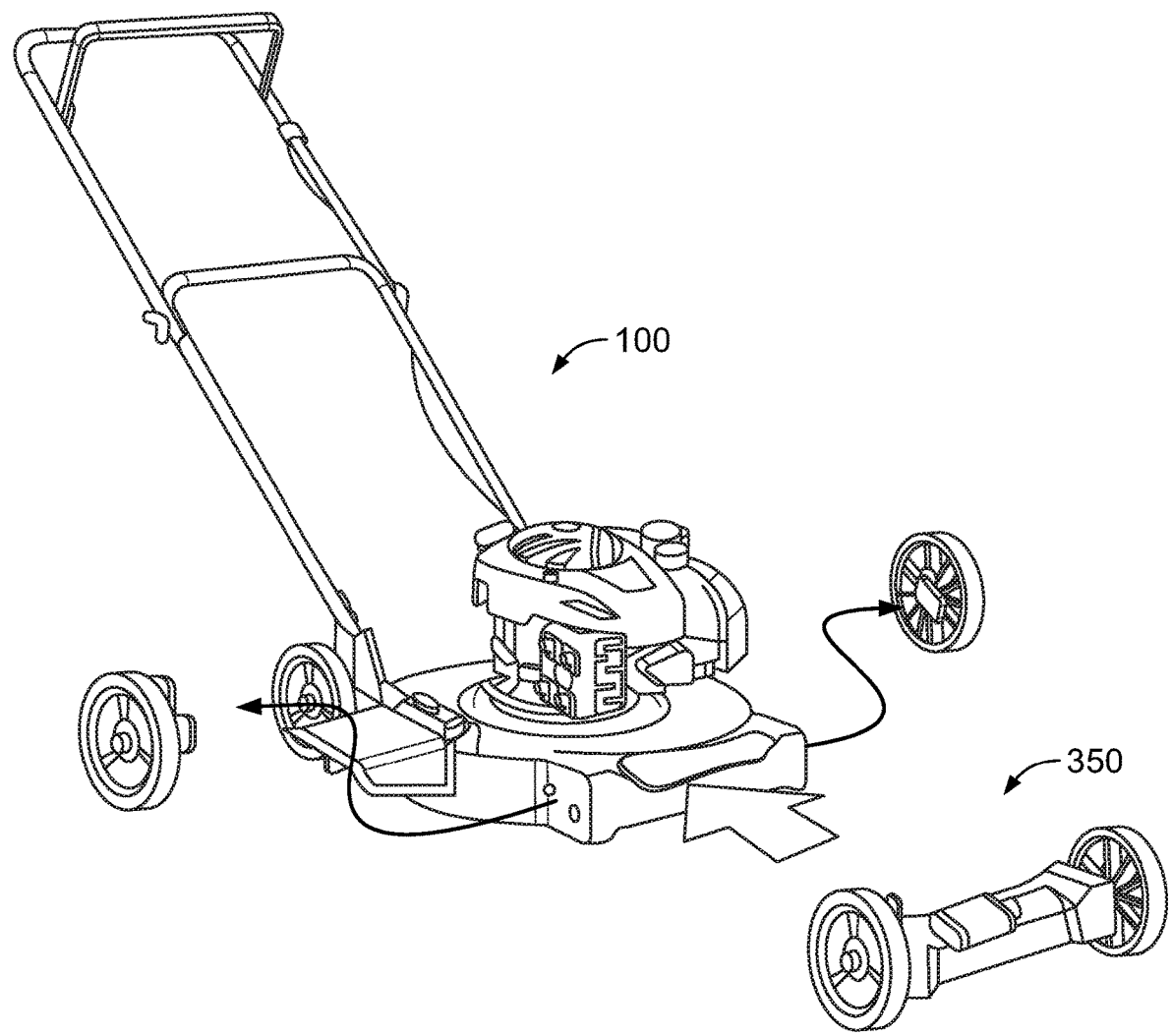
FIG. 5 depicts a schematic of how the kit of FIG. 4 is installed on a typical walk behind push-driven lawn mower.

According to some embodiments, the self-propel accessory may be provided as a kit to convert a walk behind or push-driven machine or device into a self-propelled machine or device. FIGS. 4 and 5 depict an example kit 300 for a self-propel accessory according to non-limiting embodiments, which comprises a drive assembly motor and a drive assembly, hidden by a cover, and wheel assembly 308, in a self-contained unit 350. Kit 300 further comprises power supply 302, depicted as a battery, and a charging device 352 for power supply 302. Kit 300 also comprises brackets 332 and fasteners 334 as part of an attachment assembly for coupling the self-contained unit 350 to a housing in place of a wheel assembly of the walk behind or push-driven machine or device (FIG. 5). Kit 300 includes controller 310 having a lever switch actuator 338 to engage the drive assembly motor. According to some embodiments, lever switch actuator 338 is a multi-position switch. Cable 354 is provided to operatively connect controller 310 to the drive assembly motor in any suitable manner. According to some embodiments, kit 300 also comprises instructions 356 to provide guidance about how to install and/or operate the self-propel accessory.

Alternative configurations of the self-propel accessory are contemplated. Attention is directed to FIGS. 7 to 19, which depict another example self-propel accessory 400, according to non-limiting embodiments. Whereas the example self-propel accessory 200 is configured to replace front and/or rear wheel assemblies 104, 106, example self-propel accessory 400 is configured to replace at least one wheel sub-assembly of the front and/or rear wheel assemblies 104, 106. According to some embodiments, the at least one wheel sub-assembly comprises one of front ground engagement wheel 110a, front ground engagement wheel 110b, rear ground engagement wheel 112a and rear ground engagement wheel 112b.

As shown in FIGS. 9, 11, 12 and 20, example self-propel accessory 400 comprises at least one drive assembly motor 404 operatively coupled to at least one power supply 402 via, for example, electrical wires 401, at least one drive assembly 406, an accessory wheel assembly 408 and a controller 410 for the at least one drive assembly motor 404. According to some embodiments, the at least one power supply is 402 is a component of the self-propel accessory. However, according to some embodiments, the at least one power supply 402 is provided separately.

Figure 9:
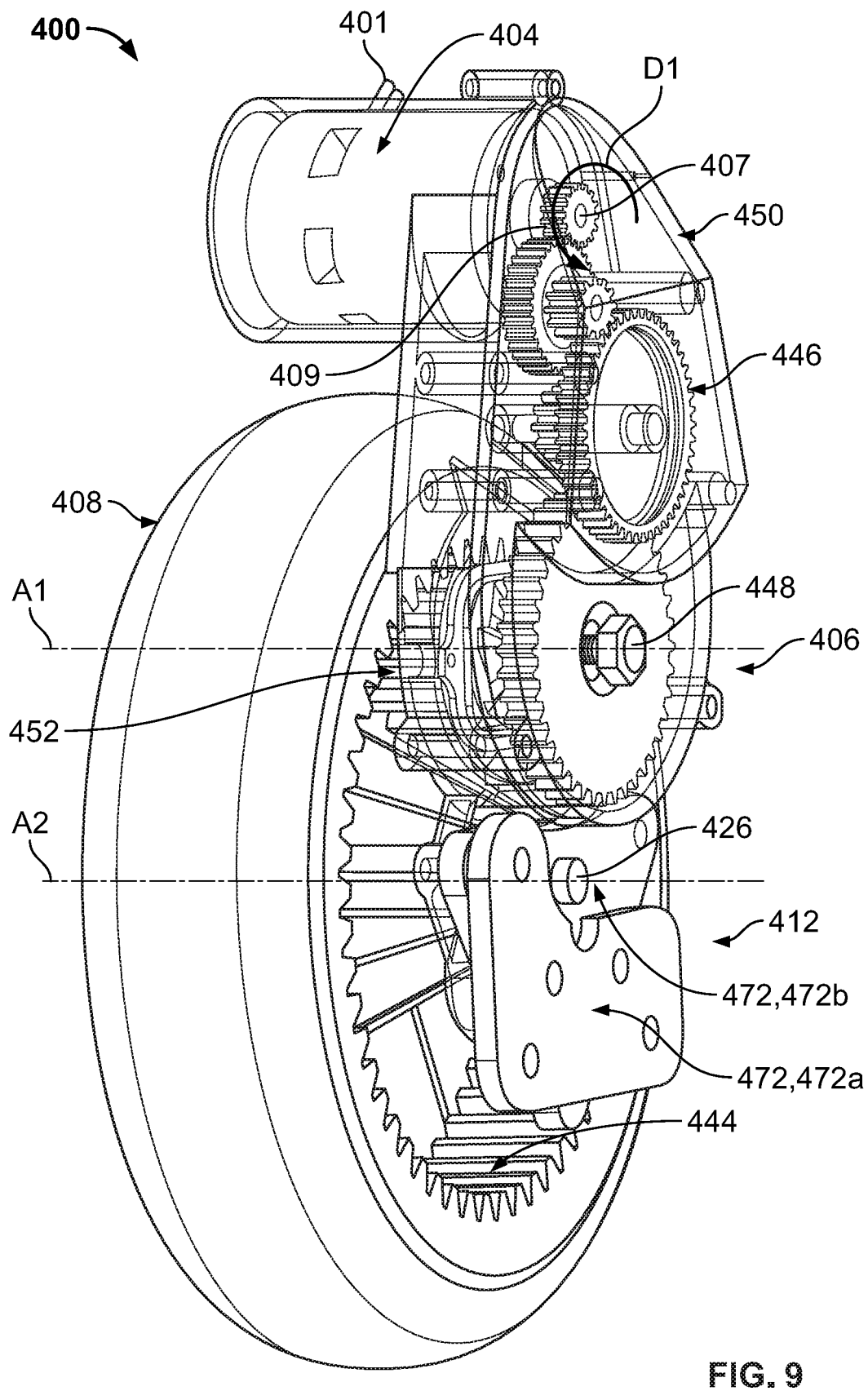
FIG. 9 depicts an enlarged view of a self-propel accessory, according to non-limiting embodiments.
Figure 10:
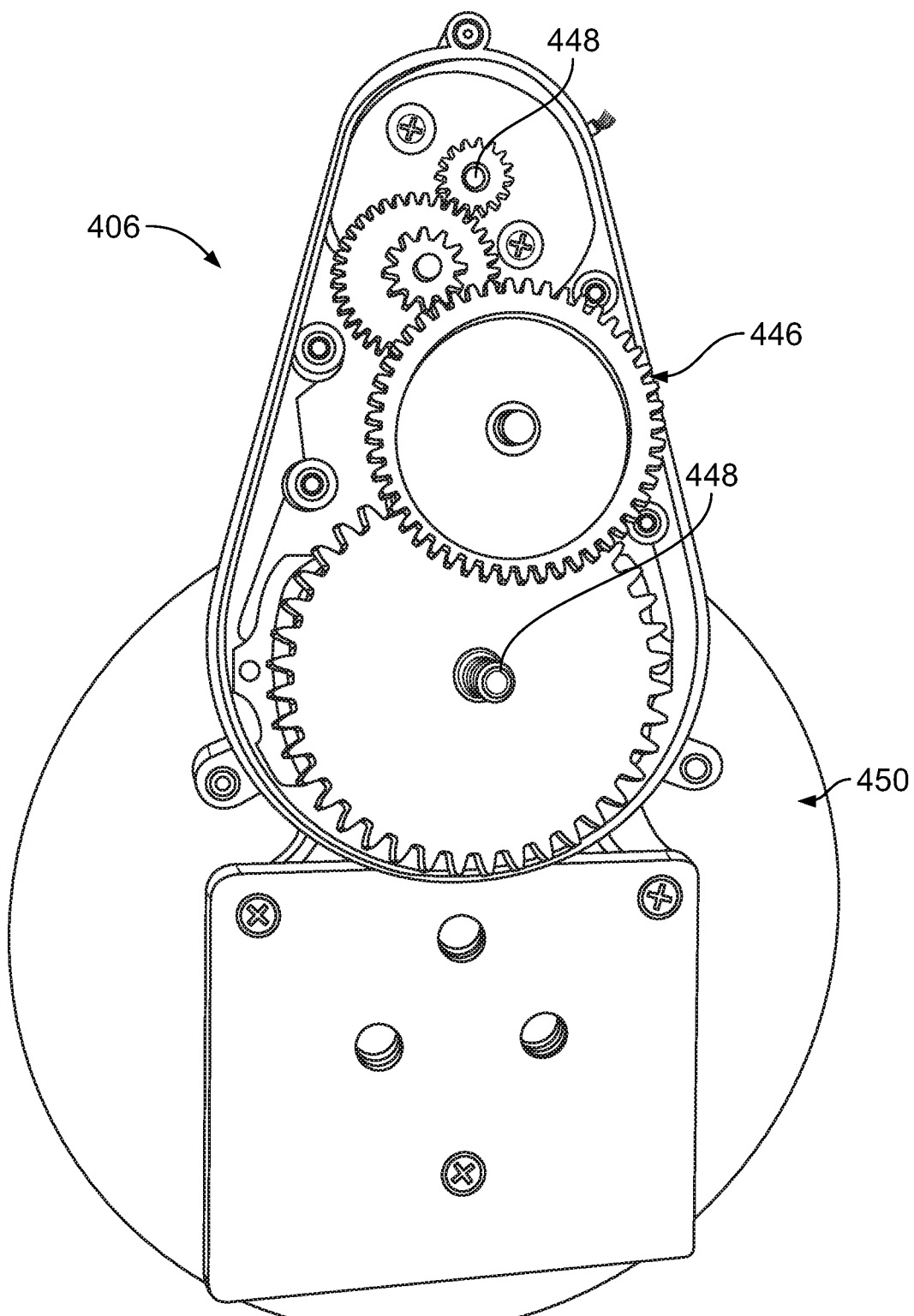
FIG. 10 depicts a side view of components of a self-propel accessory, according to non-limiting embodiments.
Figure 11:
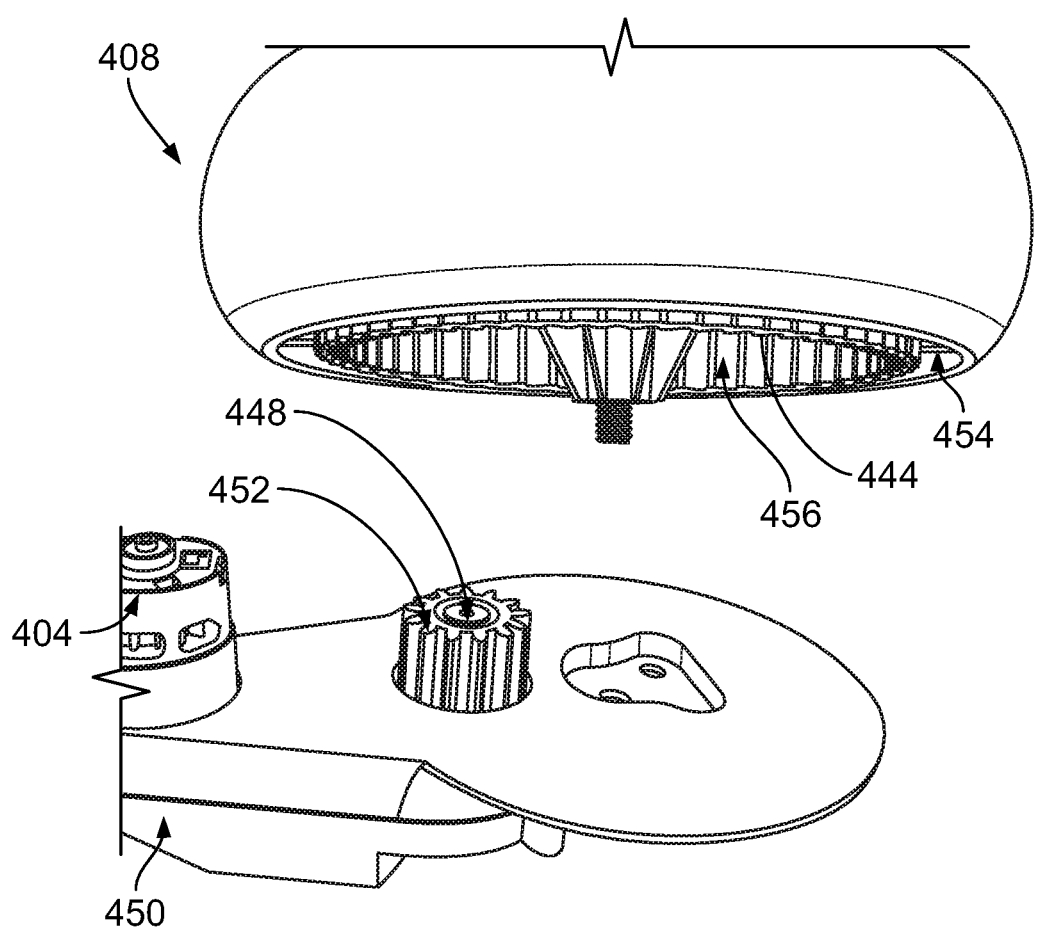
FIG. 11 depicts a side view of components of a self-propel accessory, according to non-limiting embodiments.
Figure 12:
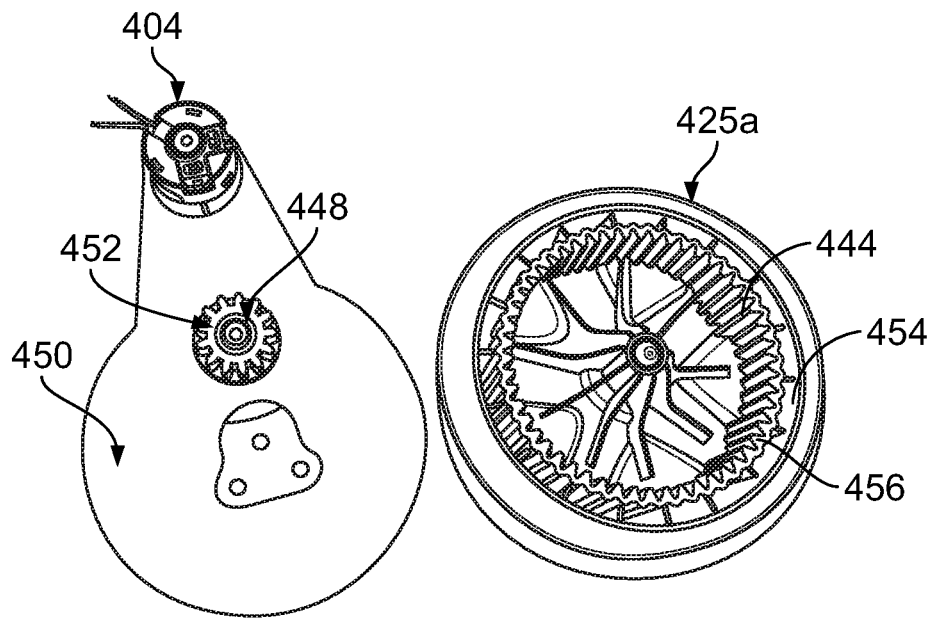
FIG. 12 depicts top view of components of a self-propel accessory, according to non-limiting embodiments.

Self-propel accessory 400 also comprises an attachment assembly 412 for coupling drive assembly motor 404, drive assembly 406 and accessory wheel assembly 408 to mower deck housing 108 in place of at least one wheel sub-assembly of front and rear wheel assemblies 104, 106 (such as front wheel 110a or rear wheel 112a). As shown in FIGS. 9, 11 and 12, accessory wheel assembly 408 of self-propel accessory 400 comprises at least one accessory ground engagement wheel, such as front accessory ground wheel 425a, operatively connected to an axle, such as axle 426. According to some embodiments, attachment assembly 412 also couples the power supply 402 to the mower deck housing 108 (directly or indirectly).

According to some embodiments, drive assembly motor 404 is a direct current (DC) motor (similarly to drive assembly motor 204). According to some embodiments, the at least one power supply, such as power supply 402, supplies voltage to the drive assembly motor 404 in the range of about 20 Volts (V) to about 40 V. According to some embodiments, the drive assembly motor 404 maybe a DC motor in the range of about 20V to about 40V. It is understood that any suitable power supply and drive assembly motor is contemplated.

Drive assembly 406 is configured to impart drive from drive assembly motor 404 to accessory wheel assembly 408. The drive assembly 406 is operatively coupled to the output shaft 407 of drive assembly motor 404 and a drive engagement surface 444 of the accessory wheel assembly 408 (shown on front wheel 425a, as an example), as discussed further below.

Drive assembly 406 comprises a plurality of gears 446 configured to transmit torque from the output shaft 407 to a shaft 448 defining an axis A1 (FIG. 9), directly or indirectly. According to the example drive assembly 406 depicted, the plurality of gears 446 may be at least partially housed in drive assembly housing 450. The plurality of gears 446 are operatively coupled to each other as is known in the art. It is understood that any suitable arrangement of the plurality of gears 446 to transmit torque from the output shaft 407 of the drive assembly motor 404 to the shaft 448 (directly or indirectly) is contemplated.

According to some embodiments, shaft 448 is coupled to wheel engagement member 452 for rotation therewith, which is configured to engage drive engagement surface 444 of the accessory wheel assembly 408. For example, as shown in FIGS. 11 and 12, wheel engagement member 452 may comprise a pinion gear threaded onto shaft 448. Example accessory wheel assembly 408 comprises front accessory ground engagement wheel 425a, for example, having a rim 454 comprised of an annular gear 456 that is configured to mesh with teeth of the wheel engagement member 452. In the example depicted, the meshing surface of annular gear 456 is the drive engagement surface 444.

According to some embodiments, in operation drive assembly motor 404 is engaged to rotate output shaft 407 in a first direction, such as D1. Output shaft 407 is coupled to first gear 409 of the plurality of gears 446 for rotation therewith. Rotational motion of the output shaft 407 is transferred by the first gear 409 to the remainder of the plurality of gears 446 which, according to some embodiments, then drive rotation of shaft 448. Since shaft 448 is coupled to wheel engagement member 452 and wheel engagement member 452 is configured to transfer rotation from shaft 448 to accessory ground engagement wheel 425 via drive engagement surface 444, rotation of shaft 448 drives rotation of wheel engagement member 452, thereby driving rotation of accessory ground engagement wheel 425 about an axis A2 defined by axle 426 (FIG. 9).

As discussed above, according to some embodiments, the described self-propel accessories may be selectively disengaged and the walk behind or push-driven machines or devices may be operated as usual even when the self-propel accessory is installed. According to some embodiments, the self-propel accessories further include a clutch assembly for engaging and disengaging the at least one drive assembly from the at least one accessory wheel assembly, based on the direction of drive to be imparted by the at least one drive assembly to the at least one accessory wheel assembly.

Attention is directed to FIGS. 14 to 17, which depict an example clutch assembly 458, according to non-limiting embodiments. Clutch assembly 458 comprises wheel engagement member 552 and drive rotation transfer member 460. Similarly to wheel engagement member 452, wheel engagement member 552 is configured to drive rotation of accessory ground engagement wheel 425a about axis A2 defined axle 426 in response to rotation of shaft 448.

Drive rotation transfer member 460 is rotatably coupled to shaft 448 (such that drive rotation transfer member 460 is enabled to rotate about shaft 448). According to some embodiments, drive rotation transfer member 460 is coupled to shaft 448 via at least one rotary bearing member, such as a bushing or ball bearing (not shown). Drive rotation transfer member 460 is also operatively coupled to drive assembly 406 such that torque transmitted by the plurality of gears 446 from the output shaft 407 is transmitted to drive rotation transfer member 460 such that drive rotation transfer member 460 rotates about axis A1 defined by shaft 448. For example, according to some embodiments, drive rotation transfer member 460 includes protrusions 464 which are configured to fittingly engage apertures 466 of gear 462 of drive assembly 406 (FIG. 15), which is also configured to rotate about axis A1. According to some embodiments, self-propel accessory 400 may include a retainer bracket 474 (FIG. 14) configured to help maintain proper alignment of rotation transfer member 460 with wheel engagement member 552.

Figure 14:
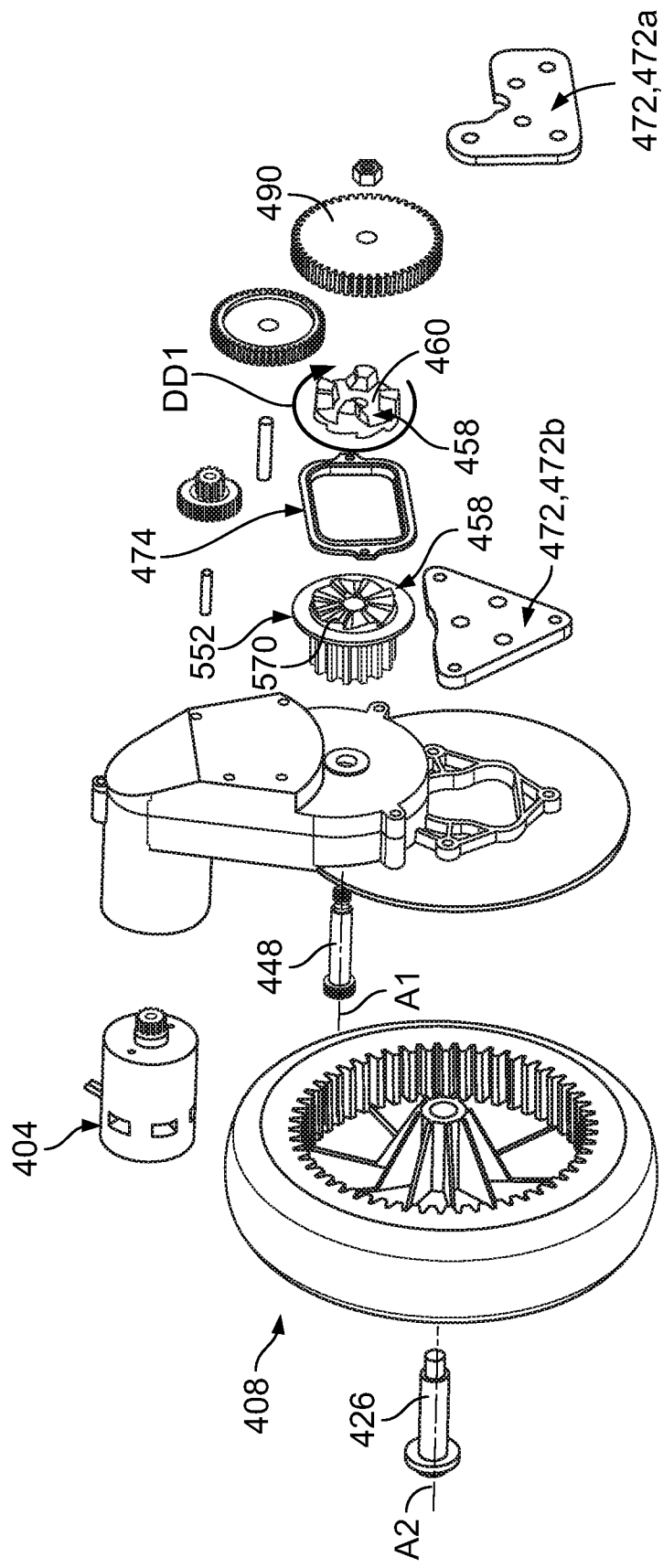
FIG. 14 depicts an exploded view of a self-propel accessory including a clutch assembly, according to non-limiting embodiments.
Figure 15:
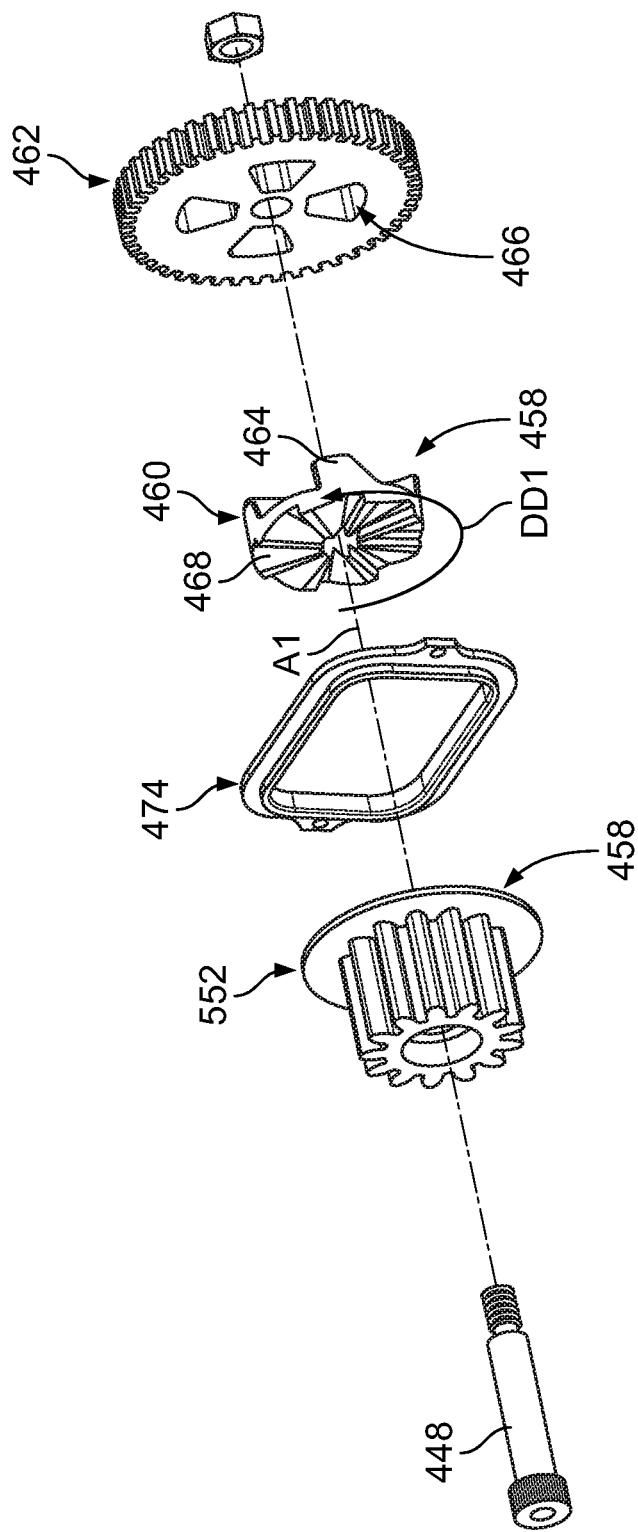
FIG. 15 depicts an exploded view of components of the self-propel accessory of FIG. 14.
Figure 17:
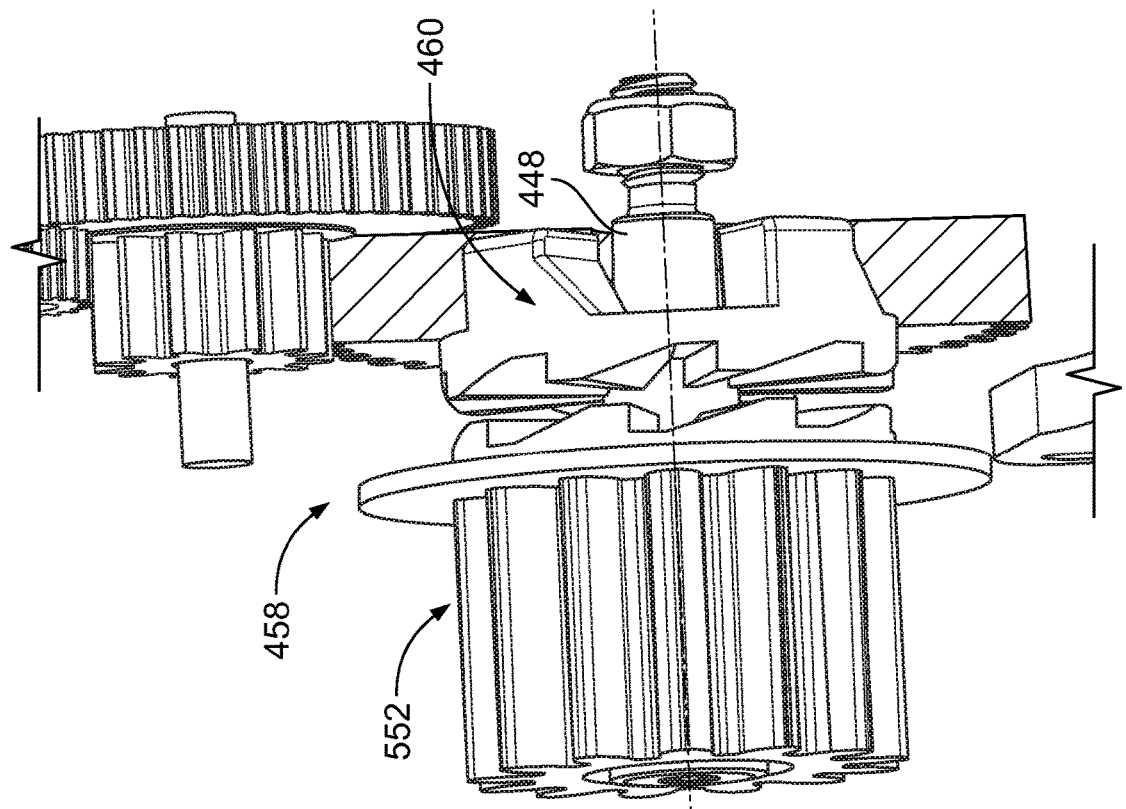
FIG. 17 depicts an enlarged side view the clutch assembly of FIGS. 14 and 15 in an open, disengaged position.
Figure 16:
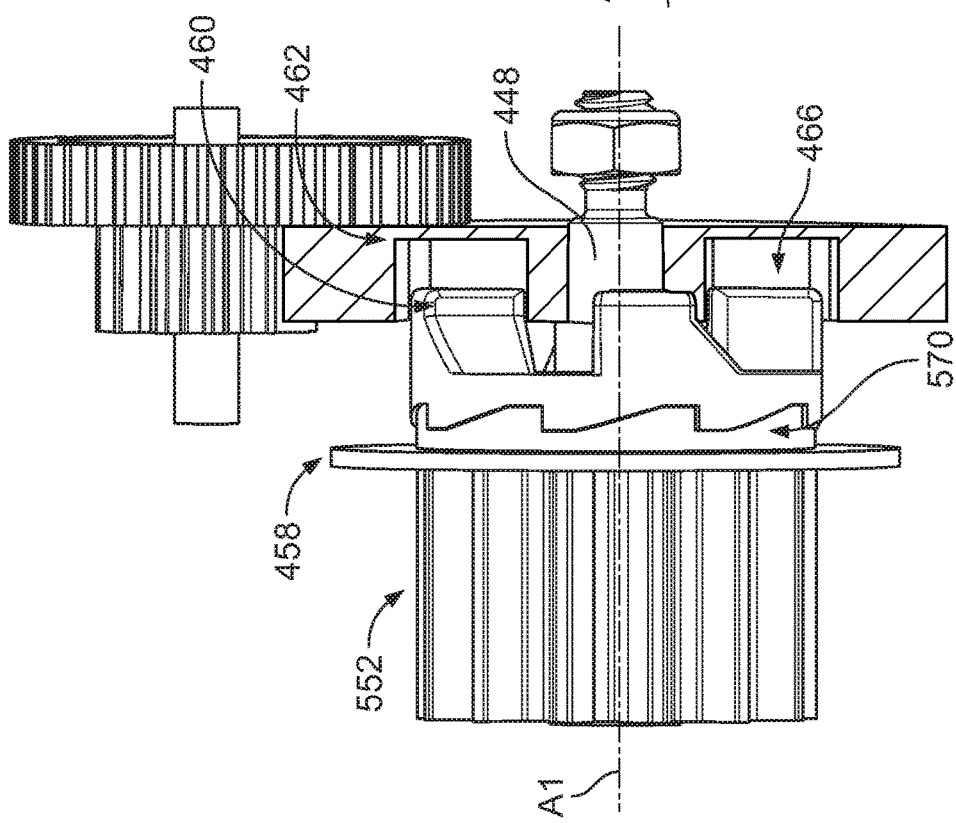
FIG. 16 depicts an enlarged side view the clutch assembly of FIGS. 14 and 15 in a closed, driving engagement position.

Depending on the direction of drive (torque) being imparted from the output shaft 407 by the drive assembly 406, drive rotation transfer member 460 may rotate in and out of driving engagement with wheel engagement member 552 to engage or disengage drive assembly 406 from accessory wheel assembly 408. For example, as shown in the example clutch assembly 458 depicted in FIGS. 14 to 17, drive rotation transfer member 460 includes directional ridges 468 which are configured to, when drive rotation transfer member 460 is rotated in a first drive direction, DD1, to drivingly engage complementary directional ridges 570 on wheel engagement member 552 (FIGS. 14 and 16). In response, wheel engagement member 552 rotates about axis A1 in first drive direction DD1. Since wheel engagement member 552 is engaged with drive engagement surface 444, wheel engagement member 552 drives rotation of accessory ground engagement wheel 425 about axis A2 of axle 426. When drive rotation transfer member 460 is rotated in a second drive direction, DD2, that is opposite first drive direction DD1, directional ridges 468 of drive rotation transfer member 460 rotate out of driving engagement with complementary directional ridges 570, as shown in FIG. 17. As a result, drive assembly 406 (and thereby drive assembly motor 404) is disengaged from wheel engagement member 552 and accessory wheel assembly 408. When wheel engagement member 552 and accessory wheel assembly 408 are disengaged from drive assembly 406, the push-driven machine or device can be propelled as usual. For example, according to some embodiments, changing the direction of drive assembly motor 404 changes the direction of rotation of output shaft 407, which changes the drive direction (DD1 vs. DD2).

Similarly to self-propel accessory 200, self-propel accessory 400 includes an attachment assembly to couple the at least one drive assembly motor 404, the at least one drive assembly 406 and the at least one accessory wheel assembly 408 to lawn mower deck housing 108. For example, as depicted in FIGS. 9, 14 and 15, attachment assembly 412 may comprise brackets 472 (individually, brackets 472a, 472b) and fasteners (not shown) coupled to the at least one drive assembly motor 404, the at least one drive assembly 406 and the at least one accessory wheel assembly 408 and configured to couple to lawn mower deck housing 108. According to some embodiments, the attachment assembly 412 is configured to removably couple self-propel accessory 400 to lawn mower deck housing 108. Any suitable arrangement of brackets and fasteners, and the like, are contemplated. For example, the fasteners may comprise any suitable combination of fasteners, such as bolts, pins, screws, nuts, and the like.

According to some embodiments, the described self-propel accessories are configured such that the accessories may be coupled to a variety of push-driven machines or devices. For example, according to some embodiments, the self-propel accessories comprise a position control mechanism configured to adjust one or more of a vertical (V), a horizontal (H) and a radial (R) position of the self-propel accessory in respect of the lawn mower deck housing.

Figure 18:
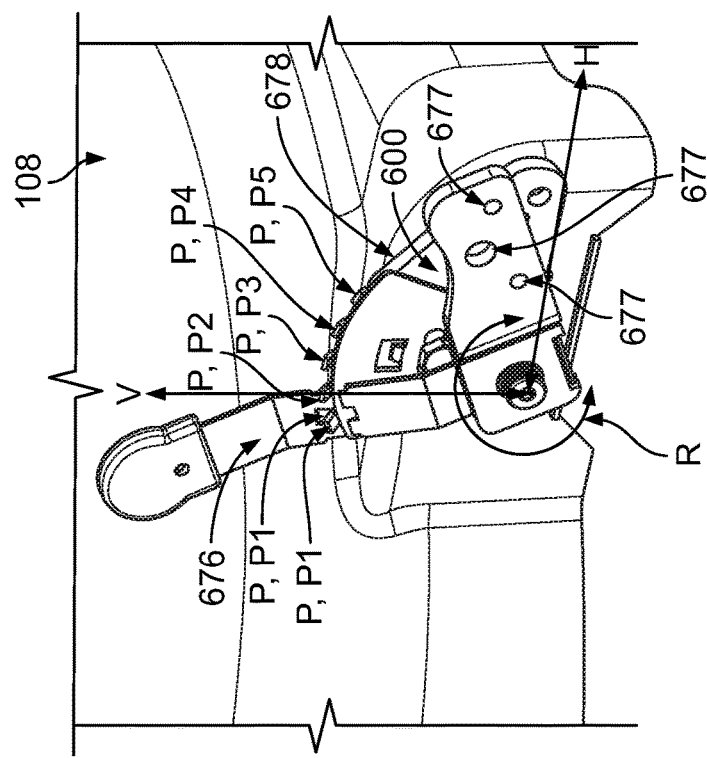
FIG. 18 depicts a position control mechanism, according to non-limiting embodiments.

Attention is directed to FIG. 18, which depicts an example embodiment of a position control mechanism 600, according to non-limiting embodiments. Position control mechanism 600 comprises adjustment lever 676 that is rotatably coupled to adjustment plate 678. Adjustment lever 676 rotates relative to adjustment plate 678. Adjustment plate 678 includes a plurality of positioning protrusions P (individually, positioning protrusion P1, P2, P3, P4 and P5) that are each associated with a radial position of adjustment lever 676 relative to adjustment plate 678. It is understood that any number of positions is contemplated (which may be more than five or less than five). Adjustment lever 676 includes retaining aperture 680. Adjustment lever 676 is retained at a particular one of the plurality of positioning protrusions, P, by engaging retaining aperture 680 with a selected positioning protrusion associated with a particular position, such as the radial position associated with positioning protrusion P1 (as shown in FIG. 18). Adjustment lever 676 and adjustment plate 678 are coupled to mower deck housing 108 using any suitable fasteners, or combination of fasteners.

Attachment assembly 412 is configured to couple to position control mechanism 600 by, for example, bracket 472a, using suitable fasteners or any suitable combination of fasteners (not shown) via, for example, mounting apertures 473 of bracket 472a and mounting apertures 677 of adjustment lever 676. Once coupled to adjustment lever 676, rotation of adjustment lever 676 from one of the plurality of positioning protrusions, such as P1, to another one of the plurality of positioning protrusions, such as P5, changes the radial position of the self-propel accessory 400 relative to mower deck housing 108. It is understood that each radial position associated with the plurality of positioning protrusions, P, is associated with a vertical and horizontal position relative to the mower deck housing 108. As a result, changing the radial position of the self-propel accessory 400 results in a change in the horizontal and vertical position of the self-propel accessory 400 relative to the mower deck housing 108, which may be helpful in adapting the self-propel accessory to the particular dimensions of the lawn mower deck housing.

Figure 19:
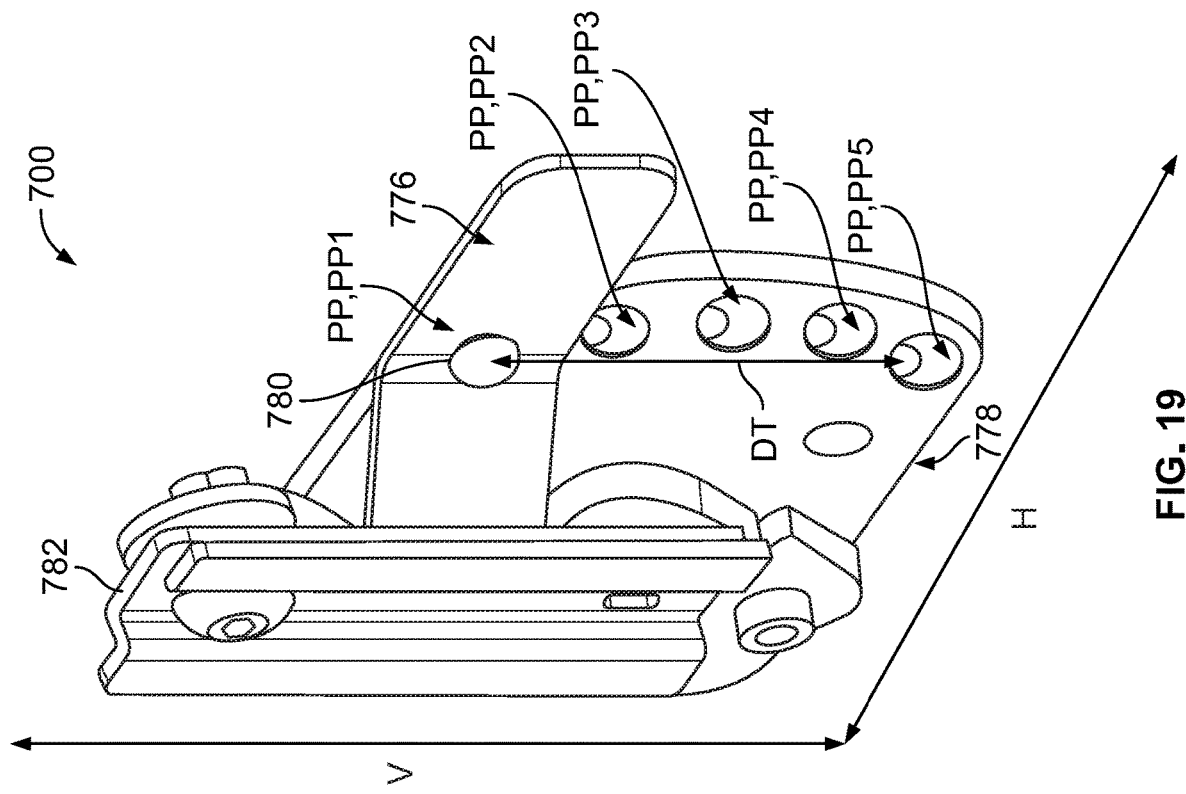
FIG. 19 depicts a position control mechanism, according to another set of non-limiting embodiments.

Attention is directed to FIG. 19, which depicts another example embodiment of a position control mechanism 700, according to non-limiting embodiments. Position control mechanism 700 comprises adjustment lever 776 coupled to adjustment plate 778 such that adjustment lever 776 is enabled to translate between vertical positions relative to the adjustment plate 778. For example, adjustment lever 776 may comprise track 782 that is configured to slidingly engage a suitable rail of the attachment assembly for the self-propel accessory or other suitable attachment component or combination of suitable attachment components (such as a bolt or protruding component configured to engage and be retained by track 782). Likewise, according to some embodiments, the configuration of the translating components of adjustment lever 776 and the attachment assembly of the self-propel device may be reversed (such that the attachment assembly comprises the track and the adjustment lever comprises the track engagement member).

Similarly to adjustment plate 678, adjustment plate 778 includes a plurality of positioning protrusions, PP (individually, positioning protrusion PP1, PP2, PP3, PP4 and PP5). Adjustment lever 776 comprises retaining aperture 780 configured to individually engage a selected positioning protrusion associated with a particular position, such as a vertical position associated with positioning protrusion PP1 (as shown in FIG. 19). Although position control mechanism 700 is depicted as being configured to adjust a vertical position of a self-propel accessory relative to the housing of the push-driven machine or device, it is understood that, according to some embodiments, the orientation of position control mechanism 700 may be altered such the adjustment in position is in respect of a horizontal position, H, relative to the housing of the push-driven machine or device, or an orientation that comprises a vertical and a horizontal position. According to some embodiments, the distance, DT, between the first positioning protrusion and the last positioning protrusion may be in the range of about 1.5 inches and about 3 inches.

Figure 20:
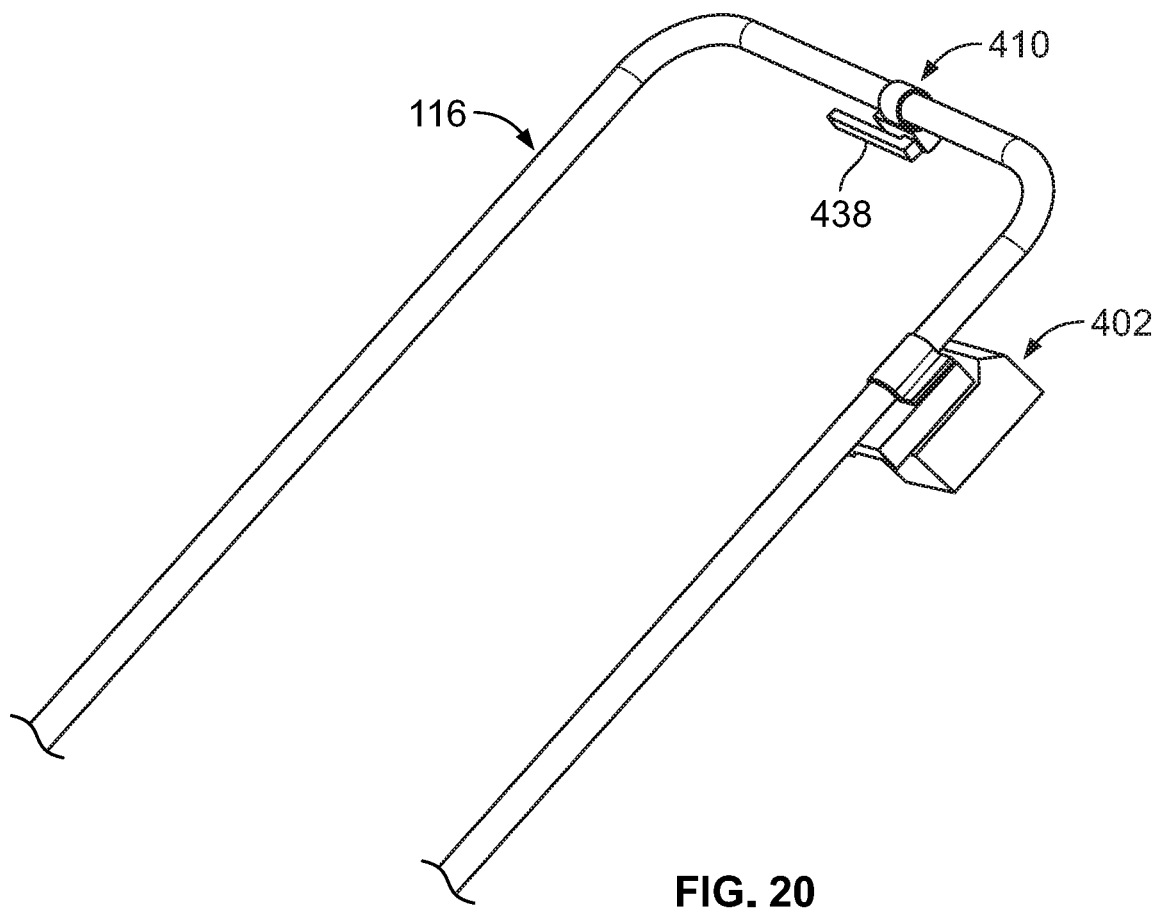
FIG. 20 depicts a controller and a power source for the self-propel accessory, according to non-limiting embodiments.

Attention is directed to FIG. 20, which depicts controller 410 of self-propel accessory 400. Similarly to self-propel accessory 200, self-propel accessory 400 comprises a controller 410 for drive assembly motor 404. Controller 410 is operatively connected drive assembly motor 404 by a suitable electrical circuit between controller 410, drive assembly motor 404 and the at least one power source 402. According to some embodiments, controller 410 is configured to drive the drive assembly motor 404 in two directions (such as a first drive direction and a second drive direction). As discussed above, in embodiments comprising the clutch mechanism, such as clutch mechanism 458, changing the drive direction of drive assembly motor 404 allows for the engagement and disengagement of the respective drive assembly from the respective accessory wheel assembly.

According to some embodiments, controller 410 has an actuator 438 for engaging drive assembly motor 404. Actuator 438 comprises any actuating device suitable for providing electrical engagement of drive assembly 404 with power supply 402. For example, according to some embodiments, actuator 438 is a switch, such as an ON/OFF switch. According to some embodiments, controller 410 is configured to provide variable speed control of drive assembly motor 404 such that the speed at which the walk behind or push-driven machines or devices traverses a path, or portion thereof, can be adjusted. For example, according to some embodiments, actuator 438 comprises a multi-position switch in which each position is associated with a different speed or drive direction of the drive assembly motor 404.

According to some embodiments, controller 410 comprises more than one actuator. For example, according to some embodiments, a first actuator may be configured to turn the drive assembly motor on and off, where ON places the self-propel accessory in a stand-by mode (i.e., drive assembly motor is electrically engaged, but drive assembly is not being driven). A second actuator may be included to engage and disengage the drive assembly such that it is being driven by the drive assembly motor. As shown in FIG. 20, according to some embodiments, controller 410 is mounted on handle bar assembly 116; however, any suitable placement of controller 410 is contemplated.

Figure 13:
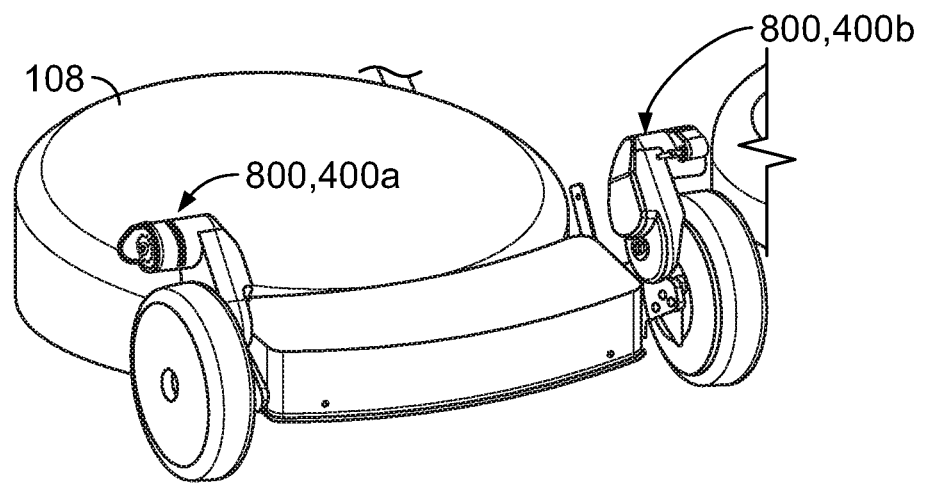
FIG. 13 depicts a system for converting a push-driven machine or device into a self-propelled machine or device, according to non-limiting embodiments.

Attention is directed to FIG. 13, which depicts an example system 800 to convert a push-driven machine or device, such as lawnmower 100, into a self-propelled machine or device. System 800 comprises at least one pair of self-propel accessories, such as a first self-propel accessory 400a and a second self-propel accessory 400b. First self-propel accessory 400a is configured similarly to self-propel accessory 400. Second self-propel accessory 400b is configured similarly to self-propel accessory 400 but is configured to be coupled to an opposing side of housing 108. In other words, self-propel accessory 400b is complementary to self-propel accessory 400a (e.g., Right-Hand-Side versus Left-Hand-Side). As depicted in FIG. 13, example system 800 is configured to couple to housing 108 in place of at least two opposing sub-assemblies of front wheel assembly 104. However, according to some embodiments, example system 800 is configured to couple to housing 108 in place of at least two opposing sub-assemblies of rear wheel assembly 106. According to some embodiments, system 800 comprises two complementary pairs of the self-propel accessories 400a and 400b, one to replace two opposing sub-assemblies of front wheel assembly 104 and one to replace two opposing sub-assemblies of rear wheel assembly 106.

Persons skilled in the art will appreciate that there are yet more alternative implementations and modifications possible, and that the above examples are only illustrations of one or more implementations. The scope, therefore, is only to be limited by the claims appended hereto.

Interpretation

It will also be understood that for the purposes of this application, "at least one of X, Y, and Z" or "one or more of X, Y, and Z" language can be construed as X only, Y only, Z only, or any combination of two or more items X, Y, and Z (e.g., XYZ, XYY, YZ, ZZ).

In the present application, components may be described as being "configured to" or "enabled to" perform one or more functions. Generally, it is understood that a component that is configured to or enabled to perform a function is configured to or enabled to perform the function, or is suitable for performing the function, or is adapted to perform the function, or is operable to perform the function, or is otherwise capable of performing the function.

Additionally, components in the present application may be described as being "operatively connected to", "operatively coupled to", and the like, to other components. It is understood that such components are connected or coupled to each other in a manner to perform a certain function. It is also understood that "connections", "coupling" and the like, as recited in the present application include direct and indirect connections between components.

References in the application to "one embodiment", "an embodiment", "an implementation", "a variant", etc., indicate that the embodiment, implementation or variant described may include a particular aspect, feature, structure, or characteristic, but not every embodiment, implementation or variant necessarily includes that aspect, feature, structure, or characteristic. Moreover, such phrases may, but do not necessarily, refer to the same embodiment referred to in other portions of the specification. Further, when a particular aspect, feature, structure, or characteristic is described in connection with an embodiment, it is within the knowledge of one skilled in the art to affect or connect such module, aspect, feature, structure, or characteristic with other embodiments, whether or not explicitly described. In other words, any module, element or feature may be combined with any other element or feature in different embodiments, unless there is an obvious or inherent incompatibility, or it is specifically excluded.

It is further noted that the claims may be drafted to exclude any optional element. As such, this statement is intended to serve as antecedent basis for the use of exclusive terminology, such as "solely", "only", and the like, in connection with the recitation of claim elements or use of a "negative" limitation. The terms "preferably", "preferred", "prefer", "optionally", "may", and similar terms are used to indicate that an item, condition or step being referred to is an optional (not required) feature of the invention.

The singular forms "a", "an", and "the" include the plural reference unless the context clearly dictates otherwise. The term "and/or" means any one of the items, any combination of the items, or all of the items with which this term is associated. The phrase "one or more" is readily understood by one of skill in the art, particularly when read in context of its usage.

The term "about" can refer to a variation of ±5%, ±10%, ±20%, or ±25% of the value specified. For example, "about 50" percent can in some embodiments carry a variation from 45 to 55 percent. For integer ranges, the term "about" can include one or two integers greater than and/or less than a recited integer at each end of the range. Unless indicated otherwise herein, the term "about" is intended to include values and ranges proximate to the recited range that are equivalent in terms of the functionality of the composition, or the embodiment.

As will be understood by one skilled in the art, for any and all purposes, particularly in terms of providing a written description, all ranges recited herein also encompass any and all possible sub-ranges and combinations of sub-ranges thereof, as well as the individual values making up the range, particularly integer values. A recited range includes each specific value, integer, decimal, or identity within the range. Any listed range can be easily recognized as sufficiently describing and enabling the same range being broken down into at least equal halves, thirds, quarters, fifths, or tenths. As a non-limiting example, each range discussed herein can be readily broken down into a lower third, middle third and upper third, etc.

As will also be understood by one skilled in the art, all language such as "up to", "at least", "greater than", "less than", "more than", "or more", and the like, include the number recited and such terms refer to ranges that can be subsequently broken down into sub-ranges as discussed above. In the same manner, all ratios recited herein also include all sub-ratios falling within the broader ratio.

What is claimed is:

1. A self-propel accessory for a push-driven machine or device comprising:
   at least one drive assembly motor, the at least one drive assembly motor operatively connected to at least one power supply;
   at least one drive assembly for imparting drive from the at least one drive assembly motor to at least one accessory wheel assembly, the at least one drive assembly being operatively connected to an output shaft of the at least one drive assembly motor and one of an axle or a drive engagement surface of the at least one accessory wheel assembly,
   the at least one accessory wheel assembly comprising:
      at least one accessory ground engagement wheel coupled to at least one end of the axle for rotation therewith;
   a controller for the at least one drive assembly motor, the controller having an actuator for engaging the at least one drive assembly motor;
   an attachment assembly for coupling the at least one drive assembly motor, the at least one drive assembly and the at least one accessory wheel assembly to a housing of the push-driven machine or device in place of a wheel assembly or a wheel sub-assembly of the push-driven machine or device; and
   a position control mechanism configured to change one or more of a horizontal position, a radial position, and a vertical position of the self-propelled accessory relative to the housing.

2. The self-propel accessory of claim 1, wherein the self-propel accessory comprises the at least one power supply.

3. The self-propel accessory of claim 1, wherein the controller is configured to provide variable speed control for the drive assembly motor.

4. The self-propel accessory of claim 1, wherein the actuator comprises an ON/OFF switch or a multi-position switch.

5. The self-propel accessory of claim 1, wherein the drive assembly motor is a direct current (DC) motor.

6. The self-propel accessory of claim 1, wherein the voltage supplied to the DC motor by the power supply is in the range of 20 Volts (V) to 40 Volts (V).

7. The self-propel accessory of claim 1, wherein the power supply is a battery.

8. The self-propel accessory of claim 7, wherein the battery is a rechargeable battery.

9. The self-propel accessory of claim 1, wherein a track width of the self-propel accessory is adjustable.

10. The self-propel accessory of claim 9, wherein the axle is adjustable in length.

11. The self-propel accessory of claim 1, wherein the push-driven machine or device is a lawn mower.

12. The self-propel accessory of claim 1, wherein the at least one accessory wheel assembly comprises a first accessory ground engagement wheel coupled to an end of the axle and a second accessory ground engagement wheel coupled to an opposing end of the axle.

13. The self-propel accessory of claim 1, wherein the attachment assembly is configured to couple the at least one drive assembly motor, the at least one drive assembly motor, the at least one drive assembly and the at least one accessory wheel assembly to the housing of the push-driven machine or device in place of the wheel sub-assembly of the push-driven machine or device.

14. The self-propel accessory of claim 1, further comprising a clutch assembly for engaging and disengaging the at least one drive assembly from the at least one accessory wheel assembly, based on the direction of drive to be imparted by the at least one drive assembly to the at least one accessory wheel assembly.

15. The self-propel accessory of claim 14, wherein the clutch assembly comprises:
   a wheel engagement member operatively connected to the at least one accessory ground engagement wheel, via the drive engagement surface, and a shaft for rotation therewith, the wheel engagement member configured to drive rotation of the at least one accessory ground engagement wheel about an axis defined by the axle;
   a drive rotation transfer member operatively connected to the at least one drive assembly, the drive rotation transfer member configured to rotate about another axis defined by the shaft in the imparted direction of drive, wherein:
      when the imparted direction of drive is a first drive direction, the drive rotation transfer member is rotated into driving engagement with the wheel engagement member, and
      when the imparted direction of drive is a second drive direction opposite the first drive direction, the drive rotation transfer member is rotated out of driving engagement with the wheel engagement member.

16. A kit for converting a push-driven machine or device into a self-propelled machine or device comprising at least one self-propel accessory according to claim 1.

17. A system for converting a push-driven machine or device into a self-propelled machine or device comprising a pair of self-propel accessories according to claim 1, wherein one of the pair of self-propel accessories is complimentary to the other one of the pair of self-propel accessories.

18. The system of claim 17 further comprising a clutch assembly for engaging and disengaging the at least one drive assembly from the at least one accessory wheel assembly, based on the direction of drive to be imparted by the at least one drive assembly to the at least one accessory wheel assembly.

19. The system of claim 18, wherein the clutch assembly comprises:
   a wheel engagement member operatively connected to the at least one accessory ground engagement wheel, via the drive engagement surface, and a shaft for rotation therewith, the wheel engagement member configured to drive rotation of the at least one accessory ground engagement wheel about an axis defined by the axle;

a drive rotation transfer member operatively connected to the at least one drive assembly, the drive rotation transfer member configured to rotate about another axis defined by the shaft in the imparted direction of drive, wherein:

when the imparted direction of drive is a first drive direction, the drive rotation transfer member is rotated into driving engagement with the wheel engagement member, and when the imparted direction of drive is a second drive direction opposite the first drive direction, the drive rotation transfer member is rotated out of driving engagement with the wheel engagement member.

20. A self-propel accessory for a push-driven machine or device comprising:

at least one drive assembly motor, the at least one drive assembly motor operatively connected to at least one power supply;

at least one drive assembly for imparting drive from the at least one drive assembly motor to at least one accessory wheel assembly, the at least one drive assembly being operatively connected to an output shaft of the at least one drive assembly motor and one of an axle or a drive engagement surface of the at least one accessory wheel assembly; and a clutch assembly for engaging and disengaging the at least one drive assembly from the at least one accessory wheel assembly, based on the direction of drive to be imparted by the at least one drive assembly to the at least one accessory wheel assembly, the at least one accessory wheel assembly comprising:

at least one accessory ground engagement wheel coupled to at least one end of the axle for rotation therewith;

a controller for the at least one drive assembly motor, the controller having an actuator for engaging the at least one drive assembly motor; and an attachment assembly for coupling the at least one drive assembly motor, the at least one drive assembly and the at least one accessory wheel assembly to a housing of the push-driven machine or device in place of a wheel assembly or a wheel sub-assembly of the push-driven machine or device; and the clutch assembly comprising:

a wheel engagement member operatively connected to the at least one accessory ground engagement wheel, via the drive engagement surface, and a shaft for rotation therewith, the wheel engagement member configured to drive rotation of the at least one accessory ground engagement wheel about an axis defined by the axle; and a drive rotation transfer member operatively connected to the at least one drive assembly, the drive rotation transfer member configured to rotate about another axis defined by the shaft in the imparted direction of drive, wherein:

when the imparted direction of drive is a first drive direction, the drive rotation transfer member is rotated into driving engagement with the wheel engagement member, and when the imparted direction of drive is a second drive direction opposite the first drive direction, the drive rotation transfer member is rotated out of driving engagement with the wheel engagement member.

* * * * *